(12) United States Patent
Huang et al.

(10) Patent No.: US 8,504,059 B2
(45) Date of Patent: Aug. 6, 2013

(54) LOCATION FILTERING USING MOBILE COUNTRY CODE

(75) Inventors: Ronald K. Huang, Milpitas, CA (US); Patrick Piemonte, San Francisco, CA (US); Morgan Grainger, Sunnyvale, CA (US); Christopher Moore, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 12/687,993

(22) Filed: Jan. 15, 2010

(65) Prior Publication Data

US 2011/0176494 A1  Jul. 21, 2011

(51) Int. Cl.
*H04Q 7/20* (2006.01)

(52) U.S. Cl.
USPC .................. 455/456.1; 455/456.2; 455/456.3; 455/458; 455/456.5; 370/252; 370/29; 701/408; 701/150

(58) Field of Classification Search
USPC .......... 370/328, 252, 29; 375/260; 455/435.2, 455/457, 456.1, 41.2, 357.09; 713/100; 701/408, 300; 702/150; 707/705, 770, 812
See application file for complete search history.

(56) References Cited

U.S. PATENT DOCUMENTS

| | | |
|---|---|---|
| 5,394,158 A | 2/1995 | Chia |
| 5,412,388 A | 5/1995 | Attwood |
| 5,444,450 A | 8/1995 | Olds et al. |
| 5,493,286 A | 2/1996 | Grube et al. |
| 5,508,707 A | 4/1996 | LeBlanc et al. |
| 5,539,924 A | 7/1996 | Grube et al. |
| 5,570,412 A | 10/1996 | LeBlanc |
| 5,642,303 A | 6/1997 | Small et al. |
| 5,802,468 A | 9/1998 | Gallant et al. |
| 5,913,170 A | 6/1999 | Wortham |

(Continued)

FOREIGN PATENT DOCUMENTS

| | | |
|---|---|---|
| EP | 1 843 524 | 10/2007 |
| EP | 2063623 | 5/2009 |

(Continued)

OTHER PUBLICATIONS

PCT Notification of Transmittal of the International Search Report and the Written Opinion of the International Searching Authority, or the Declaration, dated Jun. 9, 2011, PCT Application No. PCT/US2011/021182, pp. 1-13.

(Continued)

*Primary Examiner* — Patrick Edouard
*Assistant Examiner* — Fred Casca
(74) *Attorney, Agent, or Firm* — Fish & Richardson P.C.

(57) ABSTRACT

Methods, program products, and systems for location filtering using mobile country code (MCC) is described. A mobile device can determine its geographic location using locations of access points of a wireless communications network to which the mobile device is connected. The mobile device can wirelessly receive identifiers of one or more access points of the wireless communications network and a current MCC through a cellular network. The mobile device can identify a polygon that is a bounding box of a geographic area that corresponds to the current MCC. The mobile device can select a set of access point locations from a location database using the received identifiers, where the access point locations are inside the identified polygon. The mobile device can determine a current location of the mobile device based on an average location of the selected set of access point locations.

30 Claims, 15 Drawing Sheets

U.S. PATENT DOCUMENTS

| | | |
|---|---|---|
| 5,945,944 A | 8/1999 | Krasner |
| 5,945,948 A | 8/1999 | Buford et al. |
| 6,122,520 A | 9/2000 | Want et al. |
| 6,232,915 B1 | 5/2001 | Dean et al. |
| 6,236,861 B1 | 5/2001 | Naor et al. |
| 6,321,092 B1 | 11/2001 | Fitch et al. |
| 6,363,255 B1 | 3/2002 | Kuwahara |
| 6,424,840 B1 | 7/2002 | Fitch et al. |
| 6,445,937 B1 | 9/2002 | daSilva |
| 6,625,457 B1 | 9/2003 | Raith |
| 6,947,880 B2 | 9/2005 | Johnson et al. |
| 7,072,666 B1 | 7/2006 | Kullman et al. |
| 7,076,258 B2 | 7/2006 | Motegi et al. |
| 7,120,459 B2 | 10/2006 | Sawada et al. |
| 7,127,257 B2 | 10/2006 | Riley et al. |
| 7,133,685 B2 | 11/2006 | Hose et al. |
| 7,209,753 B2 | 4/2007 | Raith |
| 7,305,245 B2 | 12/2007 | Alizadeh-Shabdiz et al. |
| 7,346,359 B2 | 3/2008 | Damarla et al. |
| 7,403,762 B2 | 7/2008 | Morgan et al. |
| 7,414,988 B2 | 8/2008 | Jones et al. |
| 7,433,693 B2 | 10/2008 | Sheynblat |
| 7,433,694 B2 | 10/2008 | Morgan et al. |
| 7,457,628 B2 | 11/2008 | Blumberg et al. |
| 7,471,954 B2 | 12/2008 | Brachet et al. |
| 7,474,897 B2 | 1/2009 | Morgan et al. |
| 7,478,578 B2 | 1/2009 | Kirkpatrick |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,528,772 B2 | 5/2009 | Ruutu et al. |
| 7,551,579 B2 | 6/2009 | Alizadeh-Shabdiz et al. |
| 7,551,929 B2 | 6/2009 | Alizadeh-Shabdiz et al. |
| 7,587,205 B1 | 9/2009 | Odorfer et al. |
| 7,664,511 B2 | 2/2010 | Wang et al. |
| 7,769,396 B2 | 8/2010 | Alizadeh-Shabdiz et al. |
| 7,818,017 B2 | 10/2010 | Alizadeh-Shabdiz et al. |
| 7,974,642 B2 | 7/2011 | Lin et al. |
| 8,050,686 B1 | 11/2011 | Souissi et al. |
| 8,200,251 B2 | 6/2012 | Huang |
| 2002/0067308 A1 | 6/2002 | Robertson |
| 2002/0168988 A1 | 11/2002 | Younis |
| 2003/0060213 A1 | 3/2003 | Heinonen et al. |
| 2003/0087647 A1 | 5/2003 | Hurst |
| 2004/0072577 A1 | 4/2004 | Myllymaki et al. |
| 2004/0176107 A1 | 9/2004 | Chadha |
| 2004/0203845 A1 | 10/2004 | Lal |
| 2005/0040968 A1 | 2/2005 | Damarla et al. |
| 2005/0075119 A1 | 4/2005 | Sheha et al. |
| 2005/0096084 A1 | 5/2005 | Pohja et al. |
| 2005/0239478 A1 | 10/2005 | Spirito |
| 2006/0009152 A1 | 1/2006 | Millard et al. |
| 2006/0068812 A1 | 3/2006 | Carro et al. |
| 2006/0085419 A1 | 4/2006 | Rosen |
| 2006/0095348 A1 | 5/2006 | Jones et al. |
| 2006/0095349 A1 | 5/2006 | Morgan et al. |
| 2006/0106850 A1 | 5/2006 | Morgan et al. |
| 2006/0148466 A1 | 7/2006 | Brethereau et al. |
| 2006/0172737 A1 | 8/2006 | Hind et al. |
| 2006/0200843 A1 | 9/2006 | Morgan et al. |
| 2006/0211444 A1 | 9/2006 | Koike |
| 2006/0217130 A1 | 9/2006 | Rowitch et al. |
| 2006/0217131 A1 | 9/2006 | Alizadeh-Shabdiz et al. |
| 2006/0240840 A1* | 10/2006 | Morgan et al. ............ 455/456.1 |
| 2006/0264222 A1 | 11/2006 | Cole et al. |
| 2007/0002813 A1 | 1/2007 | Tenny et al. |
| 2007/0004427 A1 | 1/2007 | Morgan et al. |
| 2007/0004428 A1 | 1/2007 | Morgan et al. |
| 2007/0010261 A1 | 1/2007 | Dravida et al. |
| 2007/0066322 A1 | 3/2007 | Bahl |
| 2007/0121560 A1 | 5/2007 | Edge |
| 2007/0155307 A1 | 7/2007 | Ng et al. |
| 2007/0203647 A1 | 8/2007 | Mizuochi et al. |
| 2007/0207816 A1 | 9/2007 | Spain |
| 2007/0287473 A1 | 12/2007 | Dupray |
| 2007/0290924 A1 | 12/2007 | McCoy |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008120 A1 | 1/2008 | Alizadeh-Shabdiz |
| 2008/0008121 A1 | 1/2008 | Alizadeh-Shabdiz |
| 2008/0036661 A1 | 2/2008 | Smith et al. |
| 2008/0057955 A1 | 3/2008 | Choi-Grogan |
| 2008/0117201 A1 | 5/2008 | Martinez et al. |
| 2008/0123608 A1 | 5/2008 | Edge et al. |
| 2008/0132170 A1 | 6/2008 | Alizadeh-Shabdiz et al. |
| 2008/0139217 A1 | 6/2008 | Alizadeh-Shabdiz et al. |
| 2008/0171556 A1 | 7/2008 | Carter |
| 2008/0176583 A1 | 7/2008 | Brachet et al. |
| 2008/0186882 A1 | 8/2008 | Scherzer et al. |
| 2008/0225779 A1 | 9/2008 | Bragiel et al. |
| 2008/0259885 A1 | 10/2008 | Faulkner et al. |
| 2009/0005077 A1 | 1/2009 | Forstall et al. |
| 2009/0005080 A1 | 1/2009 | Forstall et al. |
| 2009/0005981 A1 | 1/2009 | Forstall et al. |
| 2009/0061870 A1 | 3/2009 | Finkelstein et al. |
| 2009/0067420 A1 | 3/2009 | Ganesan et al. |
| 2009/0070038 A1 | 3/2009 | Geelen et al. |
| 2009/0075672 A1 | 3/2009 | Jones et al. |
| 2009/0088183 A1 | 4/2009 | Piersol et al. |
| 2009/0132652 A1 | 5/2009 | Athale et al. |
| 2009/0149197 A1 | 6/2009 | Morgan et al. |
| 2009/0154371 A1 | 6/2009 | Alizadeh-Shabdiz et al. |
| 2009/0175189 A1 | 7/2009 | Alizadeh-Shabdiz et al. |
| 2009/0181672 A1 | 7/2009 | Horn et al. |
| 2009/0227270 A1 | 9/2009 | Naaman |
| 2009/0234876 A1 | 9/2009 | Schigel et al. |
| 2009/0252138 A1 | 10/2009 | Alizadeh-Shabdiz et al. |
| 2009/0275341 A1 | 11/2009 | Monnes et al. |
| 2009/0280801 A1 | 11/2009 | Malik |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz et al. |
| 2009/0310658 A1* | 12/2009 | Garg et al. ................. 375/222 |
| 2009/0312035 A1 | 12/2009 | Alizadeh-Shabdiz et al. |
| 2009/0312036 A1 | 12/2009 | Alizadeh-Shabdiz et al. |
| 2010/0099438 A1* | 4/2010 | Oh ............................... 455/457 |
| 2010/0156713 A1* | 6/2010 | Harper ...................... 342/357.09 |
| 2010/0234045 A1* | 9/2010 | Karr et al. .................. 455/456.1 |
| 2010/0240369 A1 | 9/2010 | Law et al. |
| 2010/0255856 A1* | 10/2010 | Kansal et al. ............. 455/456.1 |
| 2011/0047368 A1* | 2/2011 | Sundaramurthy et al. .... 713/100 |
| 2011/0165892 A1 | 7/2011 | Ristich et al. |
| 2011/0176523 A1 | 7/2011 | Huang et al. |
| 2011/0177825 A1 | 7/2011 | Huang |
| 2011/0177826 A1 | 7/2011 | Huang et al. |
| 2011/0177831 A1 | 7/2011 | Huang |
| 2011/0177832 A1 | 7/2011 | Huang |
| 2011/0249668 A1 | 10/2011 | Milligan et al. |
| 2011/0250903 A1 | 10/2011 | Huang et al. |
| 2011/0252422 A1 | 10/2011 | Rothert et al. |
| 2011/0252423 A1 | 10/2011 | Freedman et al. |
| 2011/0252429 A1 | 10/2011 | Ballard et al. |
| 2011/0252430 A1 | 10/2011 | Chapman et al. |
| 2012/0171989 A1 | 7/2012 | Matsuo et al. |

FOREIGN PATENT DOCUMENTS

| | | |
|---|---|---|
| EP | 2 110 684 | 10/2009 |
| WO | WO 00/17803 | 3/2000 |
| WO | WO 2007/147451 | 12/2007 |
| WO | WO 2008/126959 | 10/2008 |
| WO | WO 2009/059964 | 5/2009 |
| WO | 2009070138 | 6/2009 |
| WO | 2009089308 | 7/2009 |
| WO | WO 2010/129094 | 11/2010 |

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999.

"Part 16: Air Interface for Fixed Broadbank Wireless Access Systems", IEEE Std 802.16, 2004.

International Search Report and Written Opinion in PCT/US2011/021172, mailed Apr. 5, 2011, 9 pages.

International Search Report and Written Opinion in PCT/US2010/046707 mailed Dec. 8, 2010, 12 pages.

Spratt, "An Overview of Positioning by Diffusion," Wireless Networks; The Journal of Mobile Communication, Computation and Information, 2003(9)(6):565-574.

Koshima and Hoshen, "Personal locator services emerge," IEEE Spectrum, Feb. 2000, pp. 41-48.

International Preliminary Report on Patentability in PCT/US2011/021172 mailed Jul. 26, 2012, 6 pages.

International Preliminary Report on Patentability in PCT/US2010/046707 mailed Jul. 26, 2012, 9 pages.

Non-Final Office Action in U.S. Appl. No. 12/869,385 mailed Aug. 17, 2012, 27 pages.

Restriction Requirement in U.S. Appl. No. 12/869,518 mailed Jul. 25, 2012, 27 pages.

Non-Final Office Action in U.S. Appl. No. 12/869,553 mailed Jul. 13, 2012, 23 pages.

Non-Final Office Action in U.S. Appl. No. 12/869,566, mailed Sep. 28, 2012, 17 pages.

Non-Final Office Action in U.S. Appl. No. 12/959,284, mailed Oct. 24, 2012, 16 pages.

* cited by examiner

LOCATION FILTERING USING MOBILE COUNTRY CODE

TECHNICAL FIELD

This disclosure relates generally to determining a geographic location of a mobile device.

BACKGROUND

Various technologies can be employed in a wireless communications network to allow mobile devices to communicate with each other and with devices on a wired network. Depending on the technologies used, communication distances of the mobile devices can range from a few meters (e.g., in a Personal Area Network) to several kilometers (e.g., in a cellular network). Among the wireless communications technologies, a wireless local network (WLAN) can include a local area network (e.g., a computer network covering a relatively small physical area, like a home, office, or a small group of buildings such as a school) that uses radio waves for communication. Some examples of WLAN technology include WiFi, which can include any WLAN products that are based on any Institute of Electrical and Electronics Engineers (IEEE) 802.xx standards. A mobile device can communicate with other devices in the WLAN or with devices outside the WLAN through an access point of the wireless network.

In general, a cellular communications network can allow mobile devices to communicate with each other or with other devices over longer distances than those of a WLAN. Some example cellular technologies include a Global System for Mobile communications (GSM) network, or a Universal Mobile Telecommunications System (UMTS) network. A mobile device in the cellular network at a given location can have a current mobile country code (MCC) that can designate a country of the given location, a current mobile network code (MNC) that can identify a mobile network operator, a current location area code (LAC) that can identify a location area (which can be defined by the mobile network operator), and a current time zone of the location. The MCC, MNC, LAC, and current time zone information can be provided by the mobile network operator to the mobile device through a cellular tower.

SUMMARY

Methods, program products, and systems for location filtering using mobile country code (MCC) are described. A mobile device can determine its geographic location using locations of access points of a wireless communications network to which the mobile device is connected. The mobile device can wirelessly receive identifiers of one or more access points of the wireless communications network and a current MCC through a cellular network. The mobile device can identify a polygon that is a bounding box of a geographic area that corresponds to the current MCC. The mobile device can select a set of access point locations from a location database using the received identifiers, where the access point locations are inside the identified polygon. The mobile device can determine a current location of the mobile device based on an average location of the selected set of access point locations.

Techniques for location filtering using mobile country code can be implemented to achieve the following exemplary advantages. A mobile device can determine its location even though the mobile device is incapable of receiving Global Positioning System (GPS) signals. For example, the mobile device that is not equipped with or coupled to a GPS receiver can determine a current location of the mobile device. The mobile device can determine its location when the mobile device is connected to a wireless network (e.g., WiFi, WiMax, or other wireless network). The mobile device can determine its location based on locations of wireless access points to which the mobile device can connect. GPS-enabled mobile devices can also take advantage of the locations of wireless access points when, for example, GPS signals are weak (e.g., inside buildings).

Location filtering using MCC can offer an efficient way to filter out access points that are recently moved. If a mobile device has a location record of an access point to which the mobile device is connected, and the location record indicates that the access point is located in country that is different from the current country, the mobile device can exclude the access point from the location calculation. The mobile device can avoid inaccurate location calculation when, for example, an access point to which the mobile device is connected to is located in Canada but the mobile device has a record indicating the access point is located in France. Location calculation can be more accurate when techniques of location filtering using MCC are employed.

The details of one or more implementations of location filtering using MCC are set forth in the accompanying drawings and the description below. Other features, aspects, and advantages of determining locations of wireless access points will become apparent from the description, the drawings, and the claims.

BRIEF DESCRIPTION OF THE DRAWINGS

Like reference symbols in the various drawings indicate like elements.

DETAILED DESCRIPTION

Overview of Location Filtering Using Mobile Country Code

Figure 1:
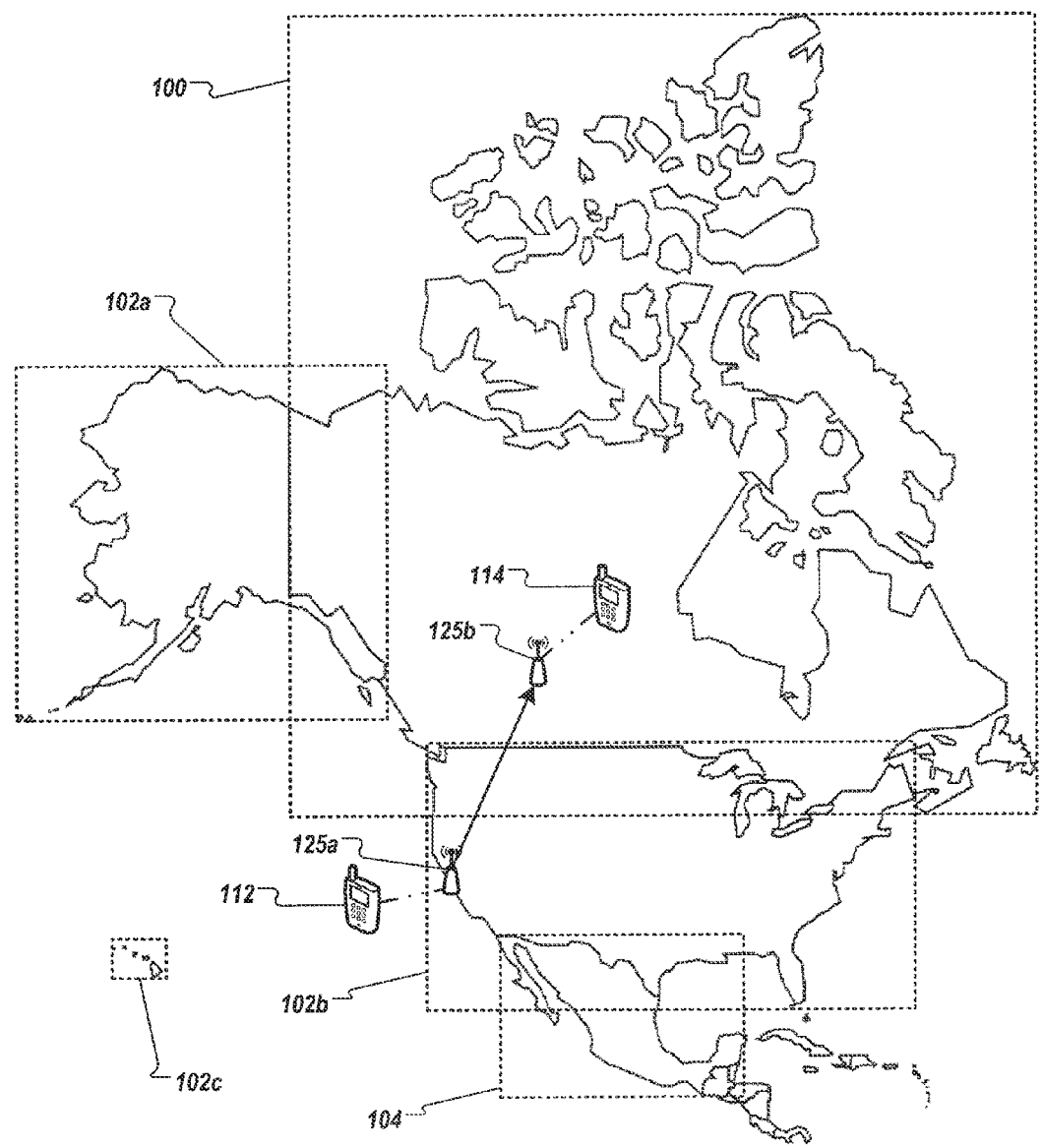
FIG. 1 is an overview of location filtering using mobile country code.

FIG. 1 is an overview of location filtering using mobile country code (MCC). For convenience, only North America and Hawaiian Islands are shown in FIG. 1. Furthermore, only Canada, United States, and Mexico are given as examples for location filtering using MCC. The techniques of location filtering using MCC is applicable for other countries and continents.

Mobile device 112 can connect to a wireless communications network through access point 125. Access points 125 can include a hardwire device or computer software that can act as a communication hub for wireless devices to connect to a wired network. Multiple access points 125 can be distributed in an area (e.g., an office building or an airport). Access point 125 can be associated with a location where access point 125 can serve. For example, access point 125a can be located in San Francisco, Calif., U.S.A., and serves a certain area (e.g., a building located at 300 Bush Street).

Mobile device 112 can use a location of access point 125 to which mobile device 112 is connected to determine a current location of mobile device 112. When mobile device 112 is wirelessly connected to access point 125a, mobile device 112 can identify the location of access point 115a from a location database. The location database can store an identifier (e.g., a Media Access Control (MAC) address) of access point 115a and the location associated with the identifier. For example, the record in the location database can associate the identifier of access point 125a with latitude and longitude coordinates 37°47'27.56"N and 122°24'08.69"W, indicating that access point 125a is located at 300 Bush Street, San Francisco, Calif., U.S.A. Mobile device 112, knowing the identifier of access point 115a because mobile device 112 is wirelessly connected to access point 115a, can determine that, at least at time of connection, mobile device 112 is located in San Francisco, Calif., U.S.A. More details of determining the location of access point 125 and the current location of mobile device 112 will be described below.

Access point 125 can be mobile. For example, access point 125a can physically move from San Francisco, Calif., U.S.A. to Edmonton, Alberta, Canada (e.g., due to company relocation). Moved access point 125a is represented as access point 125b. However, unless and until the location database is updated, the location database still associates the identifier that identifies the actual hardware component of access point 125b as San Francisco, Calif., U.S.A. Therefore, mobile device 114, currently connected to mobile device 125b located in Edmonton, Alberta, Canada, may incorrectly determine that mobile device 114b is located in San Francisco, Calif., U.S.A.

One way to avoid the incorrect location determination is to use a current MCC of mobile device 114 to filter the location database. An MCC is a code that the International Telecommunication Union (ITU) assigned to a country. The MCC is unique for each country and can be used to identify the country. Each country can have one or more MCC assigned to it. Table 1 illustrates some example MCCs and corresponding countries.

TABLE 1

Exemplary MCCs

| MCC | Country |
| --- | --- |
| 302 | Canada |
| 310-316 | United States of America |
| 334 | Mexico |

Mobile device 114 can have a subscriber MCC that can identify a country of a subscriber of mobile device 114. The subscriber MCC can indicate a home country of mobile device 114. For example, the subscriber mobile device 114 can be "334," indicating the home country of mobile device 113 is Mexico. Additionally, mobile device 114 can detect a current MCC indicating in which country mobile devices 114 is currently located. For example, the current MCC of mobile device 114 can be "302," indicating that mobile device 114 is currently located in Canada. The current MCC of mobile device 114 can be obtained from a specialized processor of mobile device 114 that is responsible for wireless communications and control. In various implementations, the specialized processors can be known as baseband processors, GMS wireless modems, and UMTS wireless modems. In this specification, unless otherwise specified, the term MCC will be used to refer to the current MCC of a mobile device rather than the home MCC of the mobile device.

Mobile device 114 can use the current MCC to filter the location database by determining whether a record in the location database is consistent with the current MCC. For example, mobile device 114 can determine that access point 125b, having a location that corresponds to San Francisco, Calif., United States, does not match the current MCC "302" which indicates that the current country is Canada. Because San Francisco is not located in Canada, mobile device 114 can determine that the record for access point 125b in the location database is incorrect, and remove the record from the database.

To determine whether the location of access point 125b is consistent with the current MCC, a system can generate polygons that are bounding boxes of each MCC and determine whether the location of access point 125b is inside the correct polygon. For example, bounding box 100 can correspond to MCC "302" (Canada). Bounding boxes 102 can correspond to MCCs "310," "311," "312," "313," "314," "315," and "316" (United States). Bounding box 104 can correspond to MCC "334" (Mexico). For clarity, bounding boxes for other North American countries are not shown in FIG. 1. The location of access point 125b, as recorded in the location database, can include a latitude and a longitude. For example, the record in the location database can associate the identifier of access point 125b with latitude and longitude coordinates 37°47'27.56"N and 122°24'08.69"W, indicating that access point 125b is located at 300 Bush Street, San Francisco, Calif., U.S.A. This location is outside of bounding box 100 for Canada. Therefore, mobile device 114 can remove the record from the location database, and use another access point to estimate a current location of mobile device 114.

The system can use various algorithms to determine a bounding box (e.g., bounding box 100) of a country associated with an MCC. A country (e.g., Canada) can be represented as one or more simple polygons whose vertices can be stored in latitude/longitude coordinates. The bounding box of a country can be a convex hull of the simple polygon of the country determined by, for example, Akl-Toussaint heuristics or Melkman's Algorithm. In some implementations, a bounding box of a country can be determined by extreme points within the boundaries of the country (e.g., easternmost, westernmost, northernmost, and southernmost points). The bounding box can be a substantially rectangular area (e.g., bounding boxes 100, 102 and 104 on a map drawn using Mercator projection. The bounding box can be stored using latitude/longitude coordinates of two points (e.g., its northwest vertex and its southeast vertex).

For example, bounding box 100 of Canada can have a northern boundary that is delineated by latitude 83°08'N, corresponding to the latitude of Cape Columbia, Ellesmere Island, Nunavut, an extreme north point within the Canadian boundary. Bounding box 100 can have a southern boundary delineated by latitude 41° 41'N, corresponding to the latitude of Middle Island, Ontario, an extreme southern point of Canada. Bounding box 100 can have an eastern boundary delineated by longitude 52°37'W (Cape Spear, Newfoundland), and a western boundary delineated by longitude 141°00'W (Yukon-Alaska border). Bounding box 100 can be stored in two sets of coordinates (e.g., 83°08'N/141°00'W and 41°41'N/52°37'W).

Some countries (e.g., the United States of America) can be represented as multiple simple polygons (e.g., 48 continental states, Alaska and Hawaii). Countries that can be represented as multiple simple polygons can have multiple bounding boxes (e.g., bounding boxes 102a for Alaska, bounding box 102b for continental 48 states, and bounding box 102c for Hawaii). Bounding boxes of various countries can overlap, as shown in the overlapping areas between bounding boxes 100 and 102a, for example.

Bounding boxes can be stored on a mobile device in association with MCCs. For example, mobile device 114 can store, or be connected to, a geographic database, in which MCCs and corresponding bounding boxes are stored. MCC "302" (Canada) can be associated with the north-west vertex and southeast vertex of bounding box 100, for instance.

When mobile device 114, whose current MCC is "302," connects to access point 125b, and identifies a location of access point 125b from the location database, mobile device 114 can compare the location against bounding box 100 to determine whether the location is inside bounding box 100. Various algorithms (e.g., ray casting algorithm or winding number algorithm) can be employed to determine whether the location is inside bounding box 100. For example, when bounding box 100 is expressed by the northwest vertex and southeast vertex, the latitude and longitude coordinates of the location of access point 125b can be compared to the latitude and longitude coordinates of the vertices to determine whether the location of access point 125b is located in the substantially rectangular area of bounding box 100.

Upon determining that the location of access point 125b is inside bounding box 100 associated with current MCC "302," mobile device 114 can proceed to estimate a current location of mobile device 114 using the location of access point 125b. If it is determined that the location of access point 125b (e.g., 37°47'27.56"N and 122°24'08.69"W) is outside bounding box 100 (83°08'N/141°00'W and 41°41'N/52°37'W), mobile device 114 can use another access point within communication range to estimate the current location of mobile device 104. Mobile device 104 can also update the location database (e.g., by deleting the record associated with access point 125b marking the location of access point 125b as "dirty"). Thus, mobile device 114 can avoid displaying an incorrect current location.

Determining Locations of Wireless Access Points

Figure 2A:
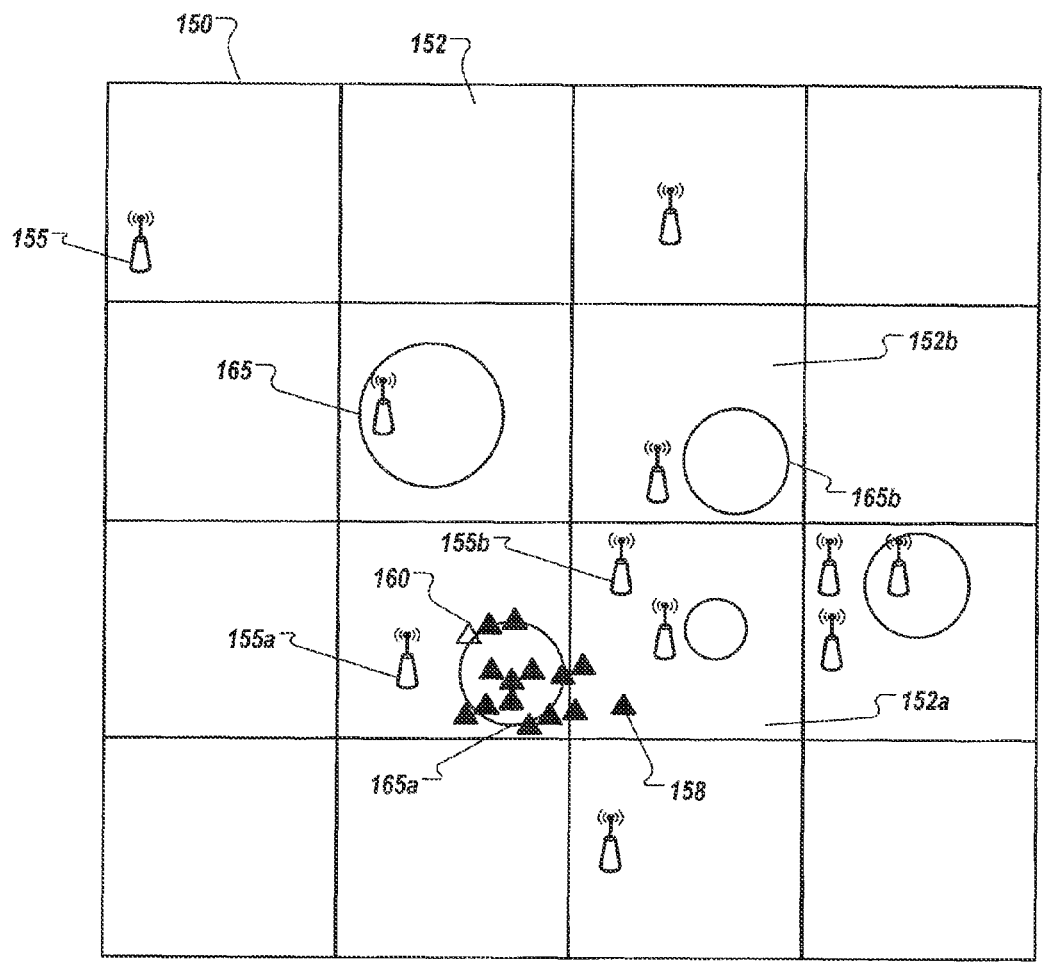
FIG. 2A is an overview of techniques of determining locations of wireless access points.

FIG. 2A is an overview of techniques of determining locations of wireless access points. For convenience, the techniques will be described in reference to a system that implements the techniques of determining locations of wireless access points.

A wireless local area network (WLAN) can be a radio communications network that includes a number of access points 155. Access point 155 can communicate with wireless devices (e.g., mobile devices 158 and 160) using various communication protocols. In some implementations, access point 155 can be an access point of a WiFi™ network, which implements an Institute of Electrical and Electronics Engineers (IEEE) 802.11-based protocol (e.g., IEEE 802.11a). In some implementations, access point 155 can be an access point of a worldwide interoperability for microwave access (WiMAX) network, which implements an IEEE 802.16 based protocol (e.g., IEEE 802.16-1554 or IEEE 802.16e-1555). Access point 155 can have a communication range that can reach from location of access point 155 to anywhere from less than ten meters to several hundred meters, depending on factors including the configuration of access point 155 and physical surroundings. Multiple wireless devices 158 and 160 can connect to an access point when mobile devices 158 and 160 are within the communication range of access point 155. In turn, multiple access points 155 can be available to a single mobile device 158 or 160 for connection. Mobile devices 158 and 160 can select a particular access point 155 to which mobile devices 158 and 160 connect, based on various factors. For example, the selection can be based on whether mobile device 158 is authorized to connect to access point 155a, or whether access point 155a can provide the strongest signal for the wireless connection to mobile devices 158.

The system can determine location areas 165 that are associated with access points 155. Location areas 165 can be calculated such that they indicate where mobile devices 158 connected to access points 155 are likely to be located. The system can make the determination based on known locations from mobile devices 158 that are connected to access points 155. Mobile devices 158 can be location-aware mobile devices, for example, GPS-enabled mobile devices that have built-in, or be coupled with, receivers that can receive Global Positioning System (GPS) signals and determine locations using the GPS signals. Location-aware mobile devices 158 are represented as black triangles in FIG. 2A. When location-aware mobile devices 158 are connected to a particular access point 155 (e.g., access point 155a), location-aware mobile devices 158 can transmit the locations of the devices to access point 155a. Access point 155a can relay the transmission, as well as an identifier of access point 155a, to the system. The system can determine an estimated location area 165a where any mobile device 158 or 160 connected to access point 155a is most likely located. In this specification, estimated location areas 165 will be referred to as presence areas; to indicate that mobile device 158 or 160, when connected to a particular access point 155, is likely to be present.

To calculate presence areas 165, the system can apply an iterative process (e.g., by performing a multi-pass analysis). The iterative process can determine a presence area (e.g., presence area 165) that is associated with an access point (e.g., access point 155) as a circle. The circle can have a center that corresponds to an average geographic location calculated based on locations of location-aware mobile devices 158 that are wirelessly connected to access point 155. The circle can have a radius that corresponds to an error margin, which can be determined by, for example, a distance between a location of a mobile device 158 and the average geographic location. Further details on the iterative process will be described below in reference to FIGS. 2 and 3. The iterative process can be executed periodically (e.g., every six hours) to capture different wireless access usage patterns during different hours of a day as well as to capture potential moves of access points 155.

The system can send information of presence areas 165 to mobile devices, including non-GPS-enabled mobile devices (e.g., mobile device 160), that are connected to access points 155 such that the receiving mobile devices can determine estimated locations of the devices using presence areas 165. For example, if mobile device 160 is connected to access point 155b, the location of mobile device 160 can be estimated as to coincide with presence area 165b that is associated with access point 155b.

In a given area (e.g., an airport), numerous access points 155 can exist. Further more, as mobile device 160 can be mobile, it can be logical to send locations of access points that are not immediately within a communication range of mobile device 160 but are close-by enough to mobile device 160, such that mobile device 160 can use the locations to track its movement. To avoid sending a large amount of location data to mobile device 160, the system can filter access points 155 and location areas 165 such that only the location data of a limited number of access points (e.g., access point 155a), rather than location data of every single access point that exists in the world, are transmitted. Filtering can be based on various factors, including popularity, stability, longevity, and freshness of locations 165 and access points 155.

To filter locations 165 and access points 155, the system can create geographic grid 150 that contain cells 152. Cell 152 can be a polygon having a substantially rectangular shape, the polygon corresponding to a geographic area identifiable on geographic grid 150 by a latitude and a longitude of an identifying point of the geographic area (e.g., a center, or a corner), and a size (e.g., a length measured in degrees of longitude, and a width measured in degrees of latitude). Each cell 152 can be used as a container that can contain a certain number of locations. For example, cell 152 can be a rectangle whose length is 0.0005 degrees meridian (approximately 56 meters) and whose width 0.0005 degrees latitude (width in meters can vary depending on the latitude). Cell 152 can be configured to hold a number (e.g., three) of presence areas 165 corresponding to access points 155. In some implementations, cell 152 can "hold" presence area 165 if the center of presence area 165 is located within boundaries of cell 152. The presence areas 165 can be selected from all presence areas 165 that are located in cell 152 based on one or more reliability factors. The selection can be based on various criteria such as popularity, stability, longevity, and freshness.

A particular access point (e.g., access point 155b) and the presence area associated with the access point (e.g., presence area 165b) need not be located in a same cell 152. This can happen, for example, when access point 155b is located on a building in cell 152a and most mobile devices 158 connected to access point 155b are located in another building in cell 152b. In some implementations, the system can ignore the actual location of access point 155b.

When mobile device 160 connects to an access point (e.g., access point 155a, whose associated presence area 165a is located in cell 152c), mobile device 160 can receive a location update from the system. The location update can include all presence areas 165 that are located in the same cell where presence area 165a is located (e.g., cell 152c). The location update can further include presence areas 165 that are located in other cells 152 (e.g., cell 152a and cell 152b) that are neighbors to cell 152c on geographic grid 150.

When mobile device 160 connects to access point 155a, mobile device 160 can detect other access points 155 (e.g., access point 155b) that are available. Mobile device 160 can identify presence areas (e.g., presence areas 165a and 165b) for the available access points. Mobile device 160 can calculate a current location of mobile device 160 using various algorithms. For example, when only one presence area 165a is identified, mobile device 160 can designate presence area 165a as the current location of mobile device 160. When two or more presence areas 165 are identified, mobile device 160 can calculate its current location using an iterative process (e.g., a multi-pass analysis). The iterative process can calculate an average location of the presence areas, calculate distances between the presence areas and the average location, and exclude presence areas that are the farthest away from the average location. Mobile device 160 can repeat the iterations until a precision requirement is satisfied for determining a location of mobile device 160. Mobile device 160 can designate the average location as a current location of mobile device 160 and display the average location on a map display device.

In some implementations, the location update received on mobile device 160 from the system can include numerous neighboring cells such that a sufficiently large area (e.g., one or two square kilometers) around presence area 165a can be covered. Based on the location update that covers the large area, mobile device 160 can avoid having to request frequent updates when mobile device 160 moves. Mobile device 160 can have opportunities to receive updated presence area information when, for example, mobile device 160 is idle or otherwise has available communication bandwidth.

Figure 2B:
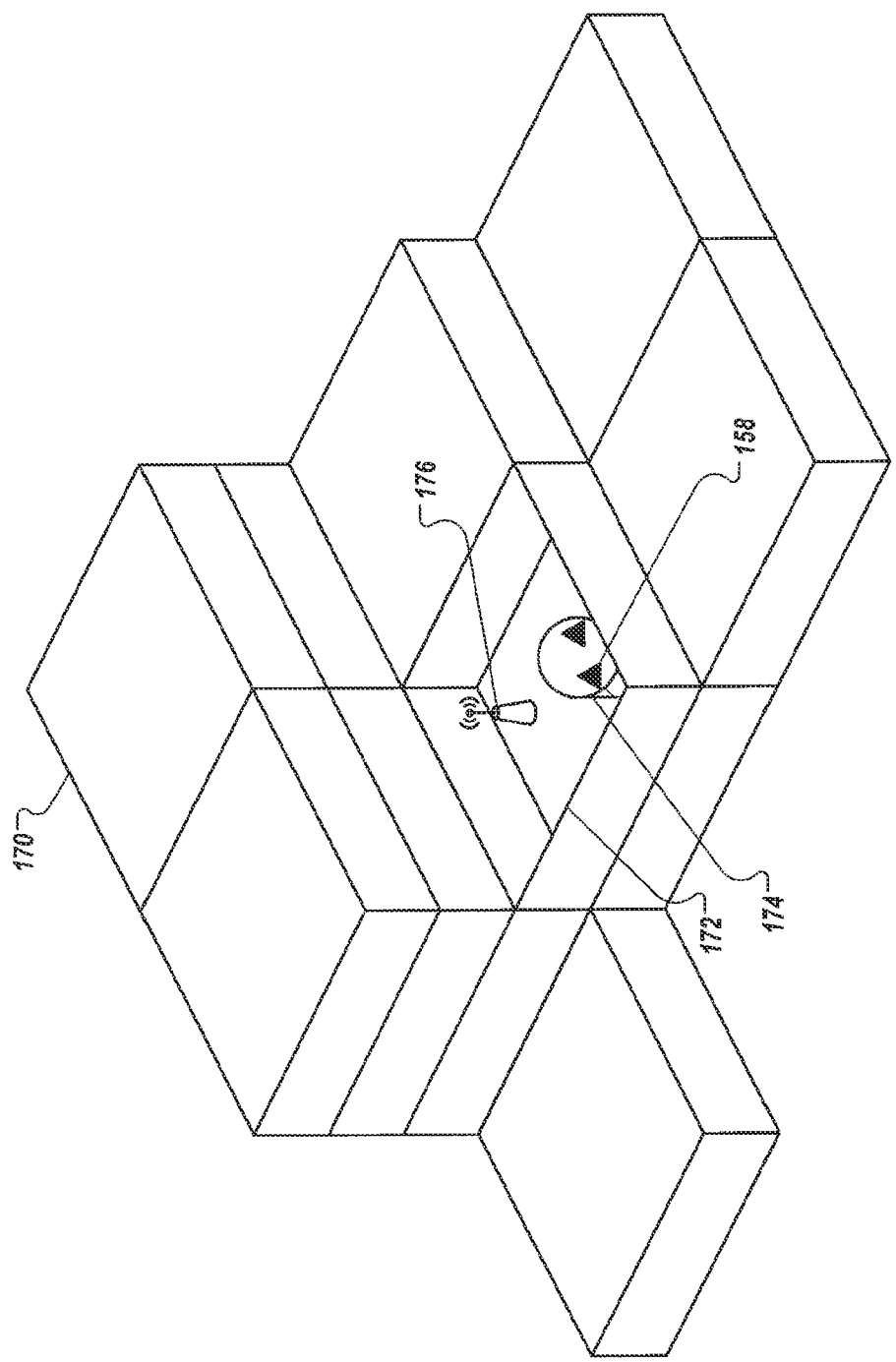
FIG. 2B illustrates determining locations of wireless access points in a three-dimensional space.

FIG. 2B illustrates determining locations of wireless access points in a three-dimensional space. Some location-aware mobile devices 158 (e.g., GPS-enabled devices) can identify locations in a three-dimensional space. The locations can be represented by latitudes, longitudes, and altitudes. Altitudes can be expressed, for example, as elevation measured in meters from sea level. Locating a mobile device in a three-dimensional space can be desirable when an altitude of the mobile device is necessary for locating the mobile device. For example, altitude can be used to determine on which floor the mobile device is located in a high-rise building. Location of mobile device 158 in three-dimensional space can be displayed on a two-dimensional map with the elevation as an annotation, or on a three-dimensional map.

Mobile devices 158 can connect to access point 176. Mobile devices 158 can be location-aware mobile devices that can transmit their locations, including latitude, longitude, and altitude coordinates to the system. The system can calculate an average location based on the latitude, longitude, and altitude coordinates received from mobile devices 158. Three-dimensional space 174, having the average location as a center and an error margin as a radius, can be associated with access point 176. Space 174 can represent a space that a mobile device is likely to be located when the mobile device is connected to access point 176. In this specification, space 174 will be referred to as a presence space.

The system can send information on presence space 174 to mobile devices that are connected to access point 176. The mobile devices receiving the information can use the information to determine their geographic locations. The system can divide a three-dimensional geographic space into three-dimensional grid 170. Three-dimensional grid 170 can be composed of three-dimensional cells 172. Each three-dimensional cell 172 can have a projection to a two-dimensional area that corresponds to cell 152 of geographic grid 150. Each three-dimensional cell 172 can have a height (e.g., measured in meters) as a dimension. Presence space 174 can be referred to as being located in cell 172 if the center of presence space 174 is in cell 172. The system can limit the number of presence spaces in cell 172 based on a popularity of the presence space (e.g., how many connections are made from mobile devices 158 in presence space to access point 176), a stability of presence space 174 (e.g., how stable presence space 174 has been), a longevity of access point 176 (e.g., how long access point 176 has existed), and a freshness of presence space 174 (e.g., when was a latest location transmission from mobile device 158 connected to access point 176 was received).

The system can transmit information on presence space 174 and neighboring presence spaces based on three-dimensional cells 172 of three-dimensional grid 170 to a mobile device (e.g., mobile device 160) that is connected to access point 176. Mobile device 160 can use the information to estimate a current location of mobile device 160 in the three-dimensional space, and display the estimated current location on a three-dimensional map.

Figure 3A:
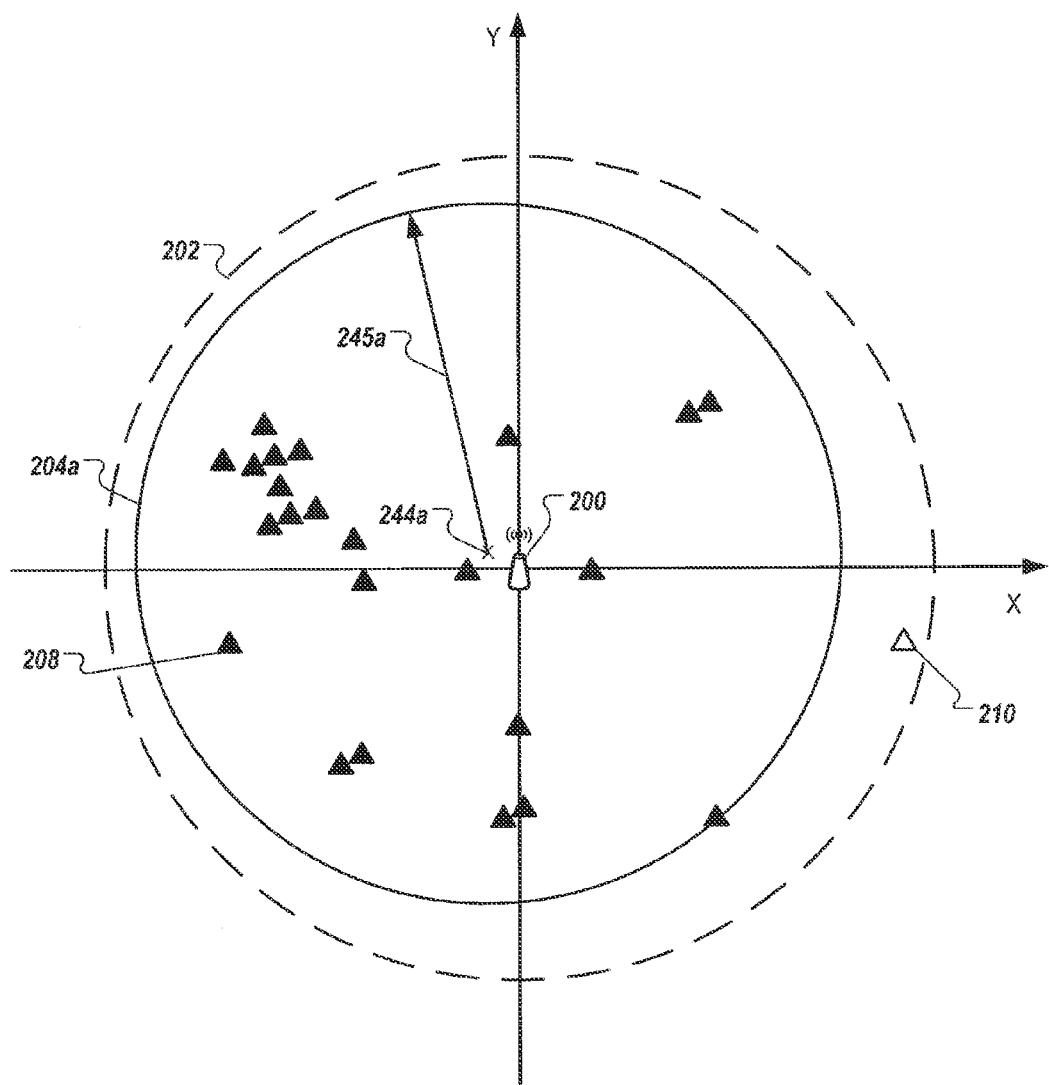
FIGS. 3A-3C illustrate exemplary stages of determining locations associated with access points in WLAN using mobile devices.
Figure 3B:
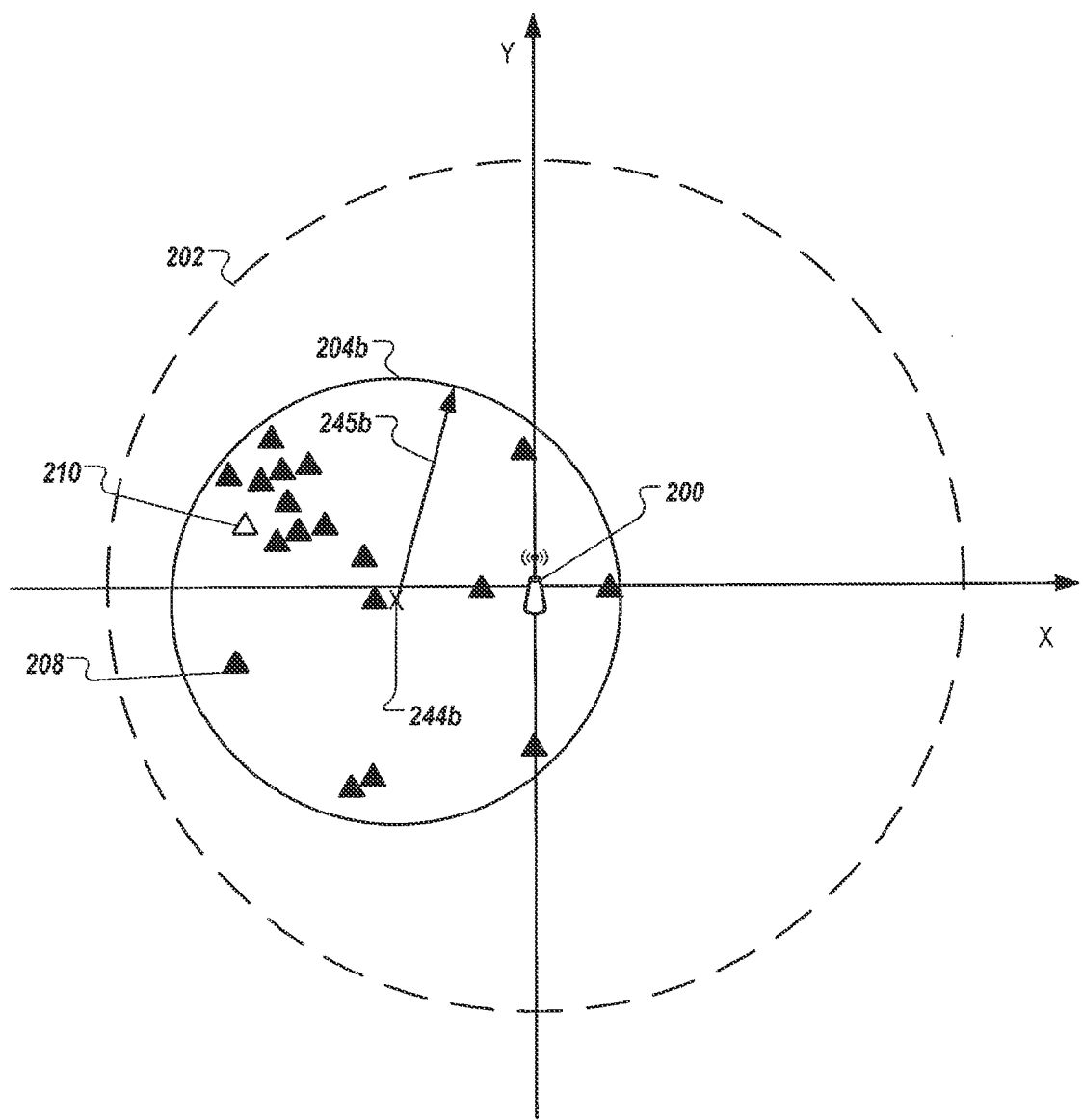
Figure 3C:
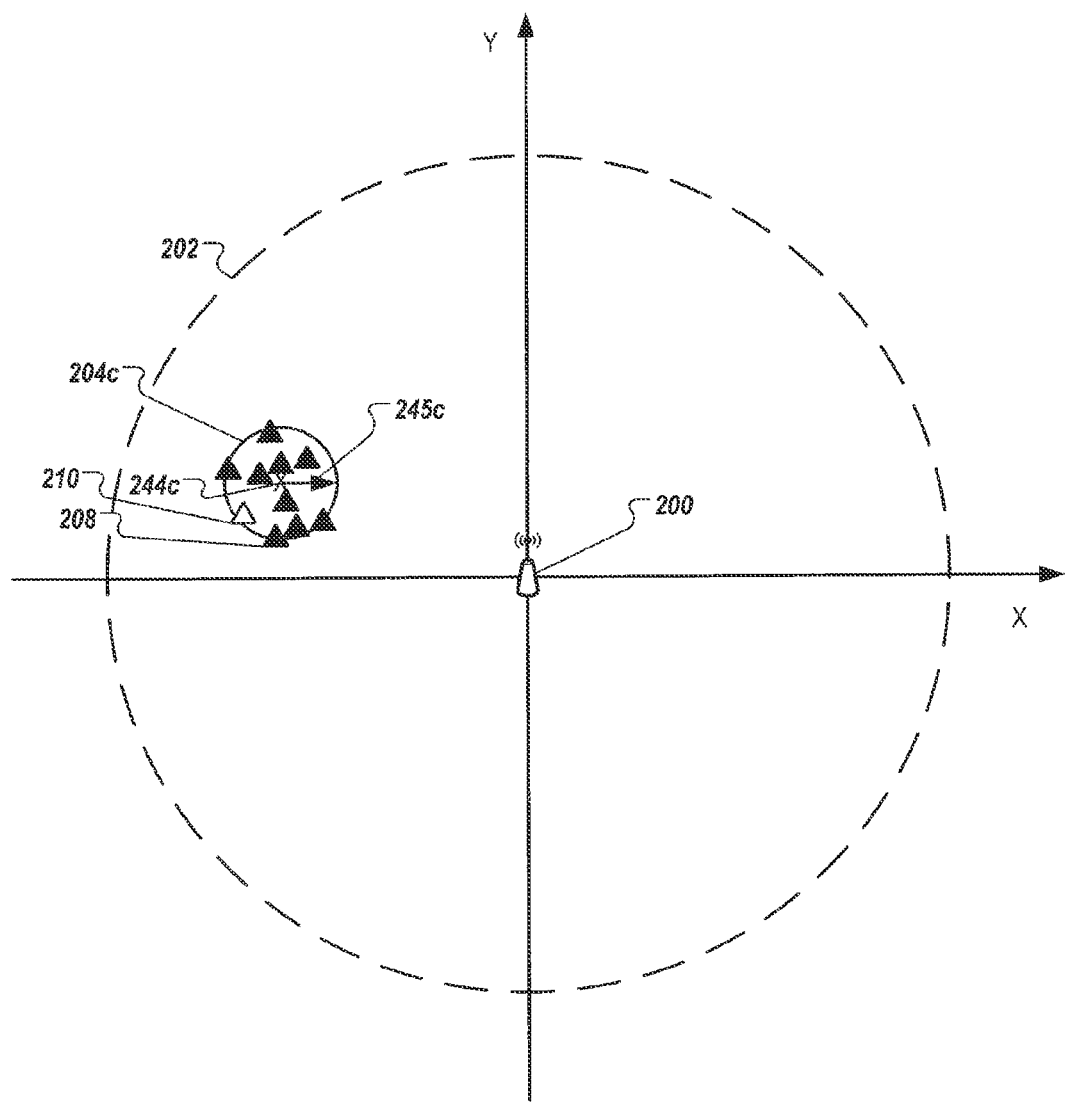

Exemplary Server-Side Process and System for Determining Locations of Wireless Access Points FIGS. 3A-3C illustrate exemplary stages of determining locations of wireless access points. For convenience, the techniques will be described in reference to a system that includes a server that implements the techniques.

FIG. 3A illustrates an exemplary stage of a multi-pass analysis that can be used to determine a presence area associated with access point 155. Access point 155 can have a coverage area 202, which can be determined by a signal strength of a transmitter of access point 155 and other factors (e.g., physical characteristics of geographic areas surrounding access point 155). Mobile devices 158 that are located within coverage area 202 can wirelessly connect to access point 155. Access point 155 can allow mobile devices 158 to connect to a wired network through various gateways. The wired network can include a data network (e.g., the Internet), a public switched telephone network (PSTN), other digital or analog networks, or a combination of the above.

Mobile device 158 can include location-aware mobile devices (e.g., GPS-enabled mobile devices). Each location-aware mobile devices 158 (represented as black triangle of FIG. 3A) can detect its current geographic location. The current geographic location can be represented by geographic coordinates that include a latitude and a longitude of mobile device 158. When mobile devices 158 communicate with access point 155, mobile devices 158 can transmit location information to the system through access point 155. The location information can be associated with an identifier of access point 155 (e.g., a Media Access Control (MAC) address of access point 155). The system can use the location information received from multiple mobile devices 158 to determine the presence area that can be associated with access point 155. The presence area does not necessarily enclose a location where access point 150 is actually located. Neither is it necessary for the presence area to correspond to the geometric location or shape of coverage area 202, although the presence area can be located within coverage area 202.

Distribution of mobile devices 158 with coverage area 202 can correspond to a snapshot of mobile devices 158 at a particular time (e.g., 8:30 am local time for a time zone in which access point 155 is located). Each mobile device 158 can be associated with a single location. Distribution of mobile devices 158 with coverage area 202 can also correspond to locations of mobile devices 158 over a period of time (e.g., six hours from 4 am to 10 am). Each mobile device 158 can be associated with multiple locations (e.g., when mobile device 158 is moving). A single mobile device 158 that is associated with multiple locations can be represented by multiple locations in the system, as illustrated by multiple triangles in FIG. 3A.

The server can determine an average geographic location of a set of locations received from mobile devices 158. The set of locations can include locations received from mobile devices 158 at a particular time or during a particular time period. The average geographic location can be designated as center 244a of circle 204a. Center 244a of circle 204a need not coincide with the location of an access point (e.g., access point 155 or access point 200). The server can calculate a distance between the average geographic location and each location in the set and identify one or more outliers. Outliers can be locations in the set that are located the farthest from the average geographic location. Outliers (e.g., location 210) whose distances to the center exceed a threshold can be excluded from the set. Circle 204a can have radius 245a that corresponds to the longest distance between the average geographic location and locations in a current set after the outliers are excluded.

FIG. 3B illustrates an exemplary stage of the multi-pass analysis subsequent to the stage of FIG. 3A. Locations whose distances to the average geographic location of FIG. 3A (center 244a of circle 204a) exceed a threshold have been excluded from the set. The threshold can be configured such that a percentage of positions (e.g., five percent of locations of FIG. 3A) are excluded. A new average geographic location can be calculated based on the locations remaining in the set (e.g., the 95 percent of locations remaining). The new average geographic location can be, for example, center 244b of circle 204b. In various implementations, calculating the new average geographic location can include averaging the remaining locations in the set, selecting a medium geographic location in the set (e.g., by selecting a medium latitude or a medium longitude), or applying other algorithms. Algorithms for calculating the average geographic location can be identical in each pass of the multi-pass analysis, or be distinct from each other in each pass.

Area encompassed by circle 204b can be smaller than the area encompassed by circle 204a as determined in a prior pass when outlier locations are excluded. The smaller area can reflect an increased precision of the calculation. Center 244b of circle 204b does not necessarily coincide with center 244a of circle 204a. In some implementations, radius 245b of circle 204b can correspond to a remaining location of mobile device 158 that is farthest away from center 244b of circle 204b. The radius can represent an error margin of the new estimation the presence area calculated in the current pass.

FIG. 3C illustrates an exemplary final stage of the multi-pass analysis. When certain exit conditions are satisfied, the system can terminate the iterative process after the final stage. The final stage can produce a final average geographic location that corresponds to a cluster of positions of mobile devices 158. The final average geographic location can be represented as center 244c of circle 204c. Circle 204c can have radius 245c that corresponds to a final error margin, which is based on a distance between the final average geographic location and a location in the cluster. Circle 204c can be designated as the presence area associated with access point 155 through and identifier (e.g., a MAC address) of access point 155.

The server can determine whether to include the identifier of access point 155 and associated presence area in a location database based on various factors. For example, the server can count the number of presence areas in cell 152 of geographic grid 150, and select a number of presence areas based on popularity, stability, and longevity. The server can send information of the presence areas (including presence area 204c if presence area 204c is selected) in the location database to a mobile device (e.g., mobile device 215), regardless whether mobile device 215 is GPS-enabled.

Figure 3D:
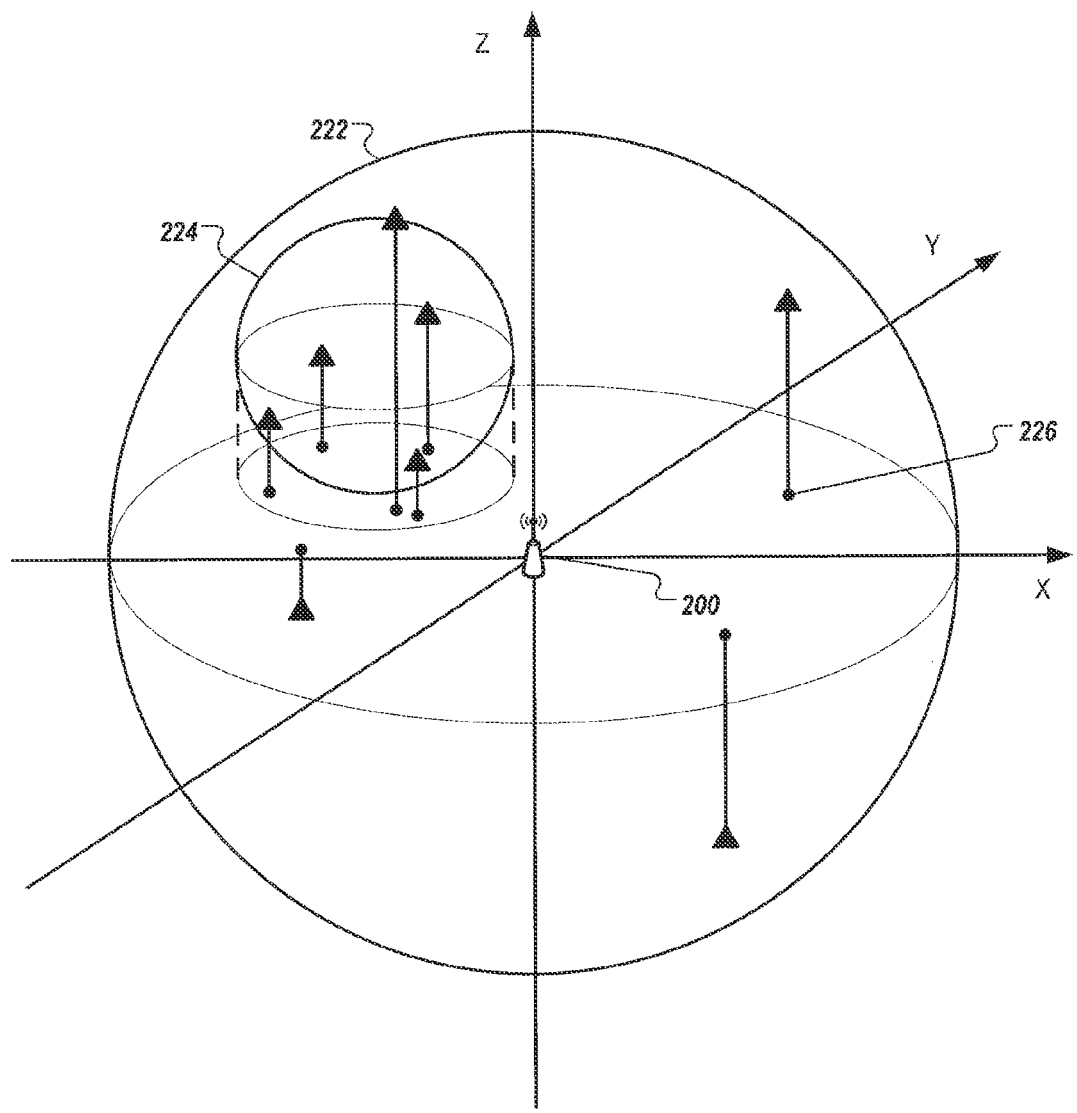
FIG. 3D illustrates an exemplary stage of determining locations associated with access points in WLAN using mobile devices in a three-dimensional space.

FIG. 3D illustrates an exemplary stage of determining locations of wireless access points in a three-dimensional space. In FIG. 3D, axes X, Y, and Z can be used to indicate the three-dimensional space. For example, axes X, Y, and Z can represent longitude, latitude, and altitude, respectively. For convenience, location of access point 176 is shown to coincide with point zero on the X, Y, and Z axes in FIG. 3D. In some implementations, an actual location (e.g., latitude, longitude, and altitude coordinates) of access point 176 is optional in the calculations.

Each triangle of FIG. 3D can represent a location of a mobile device located in the three-dimensional space. The locations can have projections (e.g., projection 226) on a plane in the three-dimensional space. The plane can be defined at arbitrary altitude (e.g., the altitude of access point 176). For example, the plane can be defined by axes X and Y. Access point 176 can correspond to a coverage space 222, which can be determined by signal strength of access point 176 and other limiting factors (e.g., floors, ceilings, buildings in signal path).

A multi-pass analysis can associate a geographic space with access point 176 of a WLAN based on a set of locations received from location-aware mobile devices 158 that are located in cell space 202. In a pass of the multi-path analysis, an average geographic location (e.g., center of space 224) can be determined by, for example, averaging the latitudes, longitudes, and altitudes coordinates of locations in the set. Distances between the average geographic location and locations in coverage space 222 can be calculated. Locations that are within coverage space 222 but are sufficiently far away from the average geographic location can be excluded from the set and from further computations. A radius of space 224 can be determined by, for example, the farthest distance between remaining locations in the set and the average geographic location.

The system can repeat the stages of calculating an average geographic location in a set, calculating distances between the average geographic location and the locations in the set, and excluding from the set locations based on the calculated distances. The repetition can continue until an exit condition is satisfied. A space having a center at the average geographic location and a radius that is based on a distance between the average geographic location and a remaining location in the set can be designated as a presence space that can be associated with access point 176.

Figure 4A:
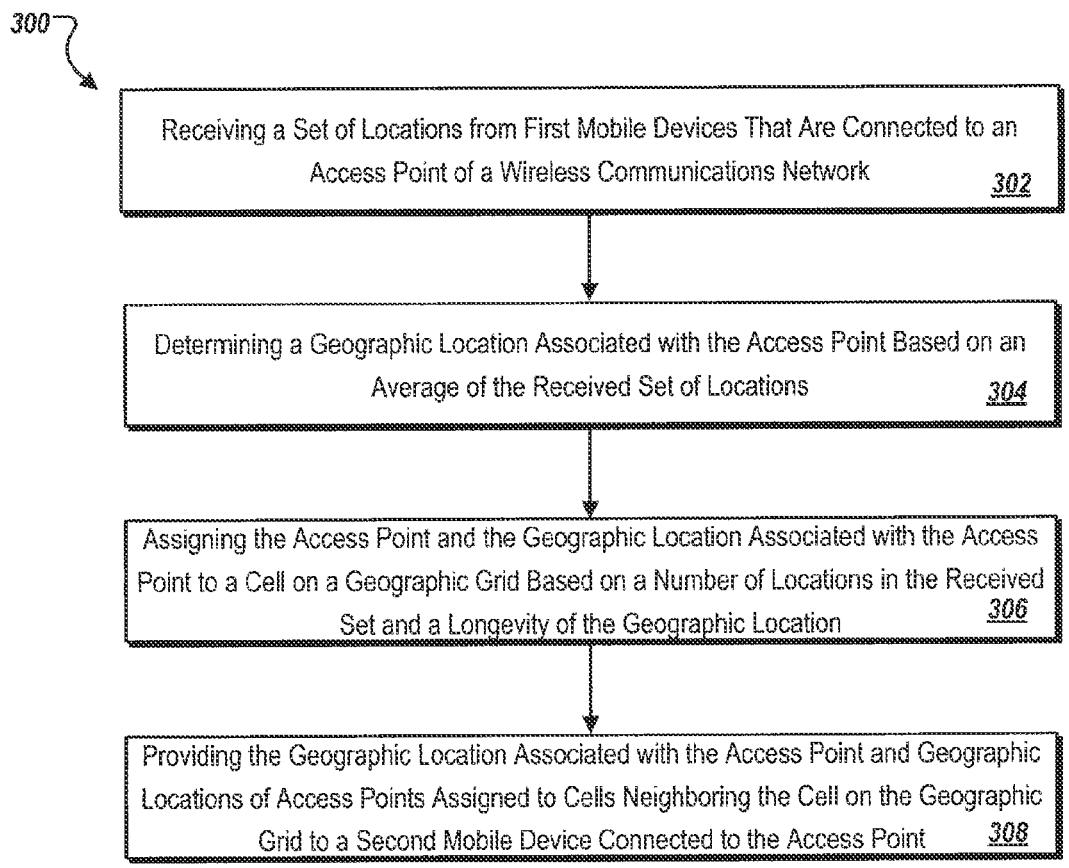
FIGS. 4A and 4B are flowcharts illustrating exemplary processes of determining locations associated with access points in WLAN using mobile devices.

FIG. 4A is a flowchart illustrating exemplary process 300 of determining locations of wireless access points. Process 300 can be used, for example, to determine a presence area or presence space associated with an access point of the WLAN. The presence area or presence space can be used to determine a location of a non-GPS-enabled mobile device. For convenience, process 300 will be described in reference to a system that implements process 300.

The system can receive (302) a set of locations from one or more first mobile devices 158 connected to access point 155. Each location can be represented by a set of geographic coordinates (e.g., a latitude, a longitude, and an altitude). The location can be associated with an identifier (e.g., a MAC address) of access point 155. The identifier of access point can be automatically supplied by access point 155 when access point 155 communicates with the system. In various implementations, the set of locations can correspond to a period of time (e.g., 6 hours, or from 6 am to 10 am of a time zone in which access point 155 is located).

In some implementations, the period of time can be configured to reflect characteristics of specific usage patterns at various hours of a day. An area where mobile devices connected to access point 155 are most likely located can vary during the day, indicating various usage patterns in specific hours. For example, the period of time can correspond to "commute time," "business hours," "night time," etc. The characteristics of the time of the day can correspond to various usage patterns of mobile devices 158. For example, during commute time, the presence area associated with access point 155 can be at or near a freeway; during business hours, the presence area associated with access point 155 can be at or near an office building; at nighttime, the presence area associated with access point 155 can spread out without a particular point of concentration. The system can calculate the presence area based on locations received, for example, from 4 am to 10 am, and recalculate the presence area based on location received from 10 am to 4 pm, etc. Locations received in each characteristic time period can be grouped into a set in the system. The locations can be stored in any data structure (e.g., set, list, array, data records in a relational database, etc.) on a storage device coupled to the server.

The system can determine (304) a geographic location associated with access point 155 based on an average of the received set of locations. The geographic location can include a presence area or a presence space as described above. The presence area or presence space can be associated with access point 155 by, for example, the MAC address of access point 155. In some implementations, determining the geographic location can include applying a multi-pass algorithm on the received set of locations, including excluding at least one location from the set in each pass. Determining the geographic location can include applying the multi-pass algorithm periodically.

The system can assign (306) access point 155 and the geographic location associated with access point 155 to a cell (e.g., cell 152) on a geographic grid (e.g., geographic grid 150) based on various factors including popularity of access point 155, stability of the geographic location, and longevity of access point 155. In some implementations, popularity of access point 155 can measure how many mobile devices 158 are connected to access point 155. Popularity of access point can be measured by, for example, how many locations of mobile devices 158 that are connected to access point 155 are received in a period of time by the system.

Stability of the presence area associated with access point 155 can reflect how reliable the presence area is, if the presence area is used for estimating a location of a device connected to access point 155. Stability of the presence area associated with access point 155 can be measured by, for example, comparing the presence areas calculated by the last two calculations, and determine a degree of overlap between the presence areas. The higher the degree of overlap, the more stable the presence area.

Longevity of access point 155 can reflect the quality of the data associated with access point 155. For example, an access point that has been in the database for a longer time can be more reliable than an access point that has been recently added. Longevity of access point 155 can be measured by a history of data in a location database.

In some implementations, a freshness of data can also be used to determine whether the presence area associated with access point 155 will be assigned to cell 152 of geographic grid 150. The freshness of data can be measured by how long ago the system received the most recent location from mobile device 158.

The system can rank each presence area located in cell 152 of geographic grid 150 based on the popularity, stability, longevity, and freshness. At least a portion of all the presence areas located in cell 152 (e.g., three presence areas, including the presence area that is associated with access point 155) can be assigned to cell 152. Assigned access points and presence areas can be used for locating mobile devices (e.g., mobile devices 160) that are connected to access point 155. Unassigned presence areas can be stored in the location database for future use.

The system can provide (308) the geographic location associated with access point 155 to a second mobile device (e.g., mobile device 160) that is connected to access point 155. The system can further provide other geographic locations located in the same cell, as well as geographic locations associated with access points assigned to neighboring cells to the second mobile device. The locations can be transmitted from access point 155 to the second mobile device upon request or using various push or broadcast technologies.

In some implementations, the system can receive, process, and transmit three-dimensional location information. Presence spaces (e.g., presence space 174) can be assigned to three-dimensional cells (e.g., three-dimensional cell 172) on a geographic three-dimensional grid (e.g., three-dimensional grid 170). The locations can be transmitted from access point 176 to a second mobile device that is connected to access point 176 upon request or using various push or broadcast technologies.

Figure 4B:
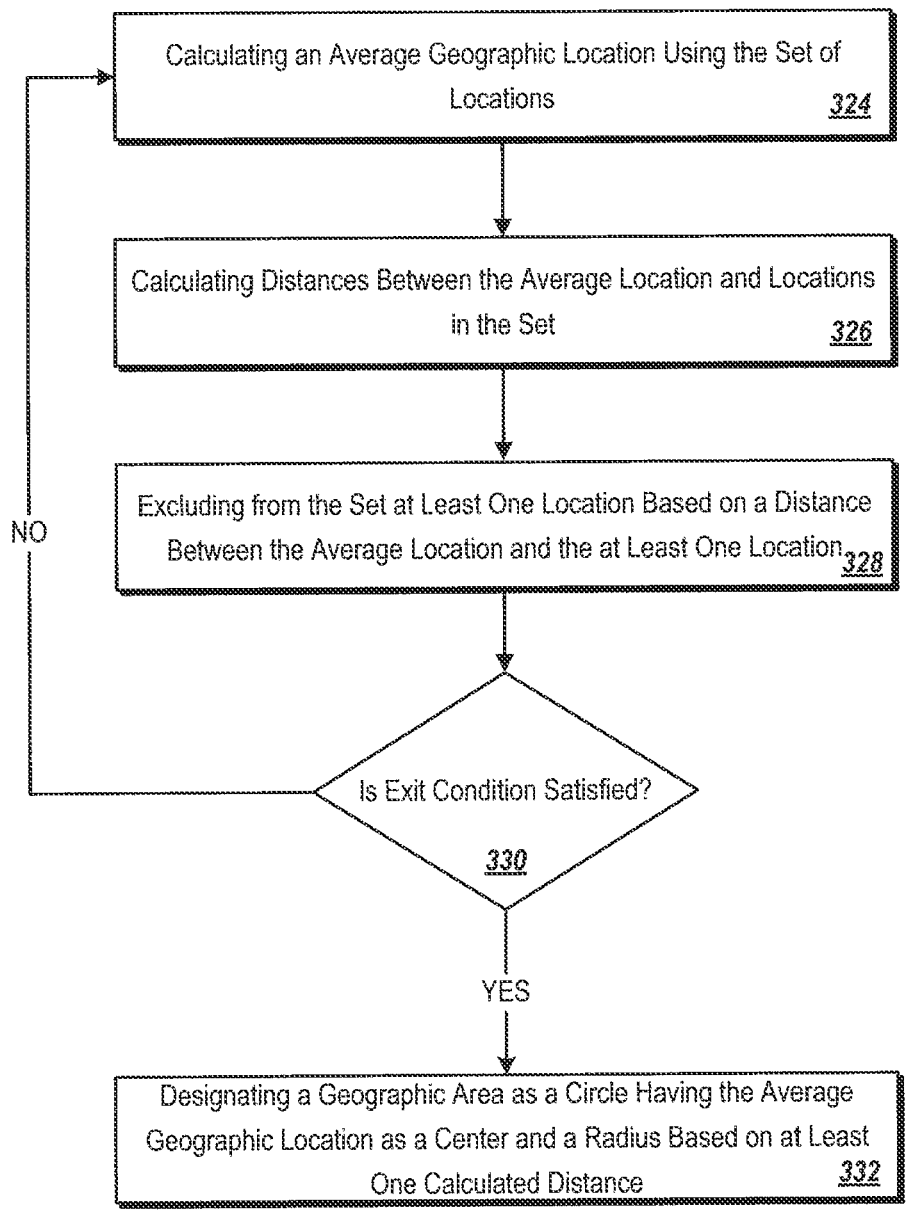

FIG. 4B is a flowchart illustrating an exemplary process 304 of calculating an average geographic location using a set of locations. For convenience, process 304 will be described in reference to a system that implements process 304.

The system can calculate (324) an average geographic location using the locations in the set. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a position at a median latitude, median longitude, and median altitude of the positions in the set as the average geographic location.

The system can calculate (326) distances between the locations in the set and the average geographic location. In some implementations, the system can calculate a linear distance between each of the locations in the set and the average geographic location in Euclid space. In some implementations, the system can calculate a geodesic distance between each of the locations in the set and the average geographic location, taking curvature of the earth into consideration.

The distances calculated in stage 326 can be designated as a radius associated with a center. The center can be the average geographic location calculated in stage 324, which can be a center (e.g., center 244*a*) of a circle (e.g., circle 204*a*). The radius (e.g., radius 245*a*) of the circle can be determined based on at least one distance between a location in the set of locations and the average geographic location. In some implementations, the radius can equal to the longest distance between the average geographic location and a location remaining in the set. In some implementations, the radius can be a distance that, when circle 106*d* is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

The system can exclude (328) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating the presence area associated with access point 155, and can be excluded. In various implementations, the threshold distance can vary from one pass to a next pass. In some implementations, the threshold distance can be a distance to the average geographic location within which a certain percentage (e.g., 95 percent) of locations in the set are located. In some implementations, the threshold distance can be a set of distances corresponding to the passes (e.g., 250 meters for the first pass, 150 meters for the second pass, etc.). The system can exclude at least one location from the set when the distance between the average geographic location and the location exceeds the threshold distance.

The system can repeat stages 324, 326, and 328 of process 304 until an exit condition is satisfied. The system can determine (330) whether an exit condition is satisfied for terminating the repetition. In some implementations, the exit condition can be satisfied when a number of repetitions reach a threshold number (e.g., 10 times). The threshold number, as well as the percentage of locations to exclude, can be configurable to fine tune a balance between certainty (e.g., a larger presence area can result in more confidence that a mobile device in the cell is actually located in the presence area) and precision (e.g., a smaller presence area can result in more accurate location of a mobile device). For example, when the percentage is set to 95 percent and the number of passes is set to 10, the final pass can produce a circle that encompasses about 60 percent of all location data points.

In some implementations, the exit condition of stage 330 can be satisfied when the presence area or presence space is sufficiently small. In cells where mobile devices are highly concentrated, a presence area can be sufficiently small that further passes will not necessarily increase the precision. The repetition of stages 324, 326, and 328 can terminate when the radius of the circle reaches below a threshold radius. For example, the threshold radius can be 8-10 meters. The threshold radius can differ from access point to access point, based on the distribution pattern of the locations in the set received (e.g., number of location data points received, density of the location data points, and concentration areas in the cells).

The system can designate (332) the geographic area as a circle having the average geographic location as a center and a radius based on at least one calculated distance. The geographic area can be associated with an access point (e.g., access point 155). The server can provide the geographic area (e.g., the center and radius) for displaying on a map display of a mobile device. The center can be represented in latitudes and longitudes. In some implementations where distances are calculated in three-dimensional spaces, the center can further be represented in an altitude.

Figure 4C:
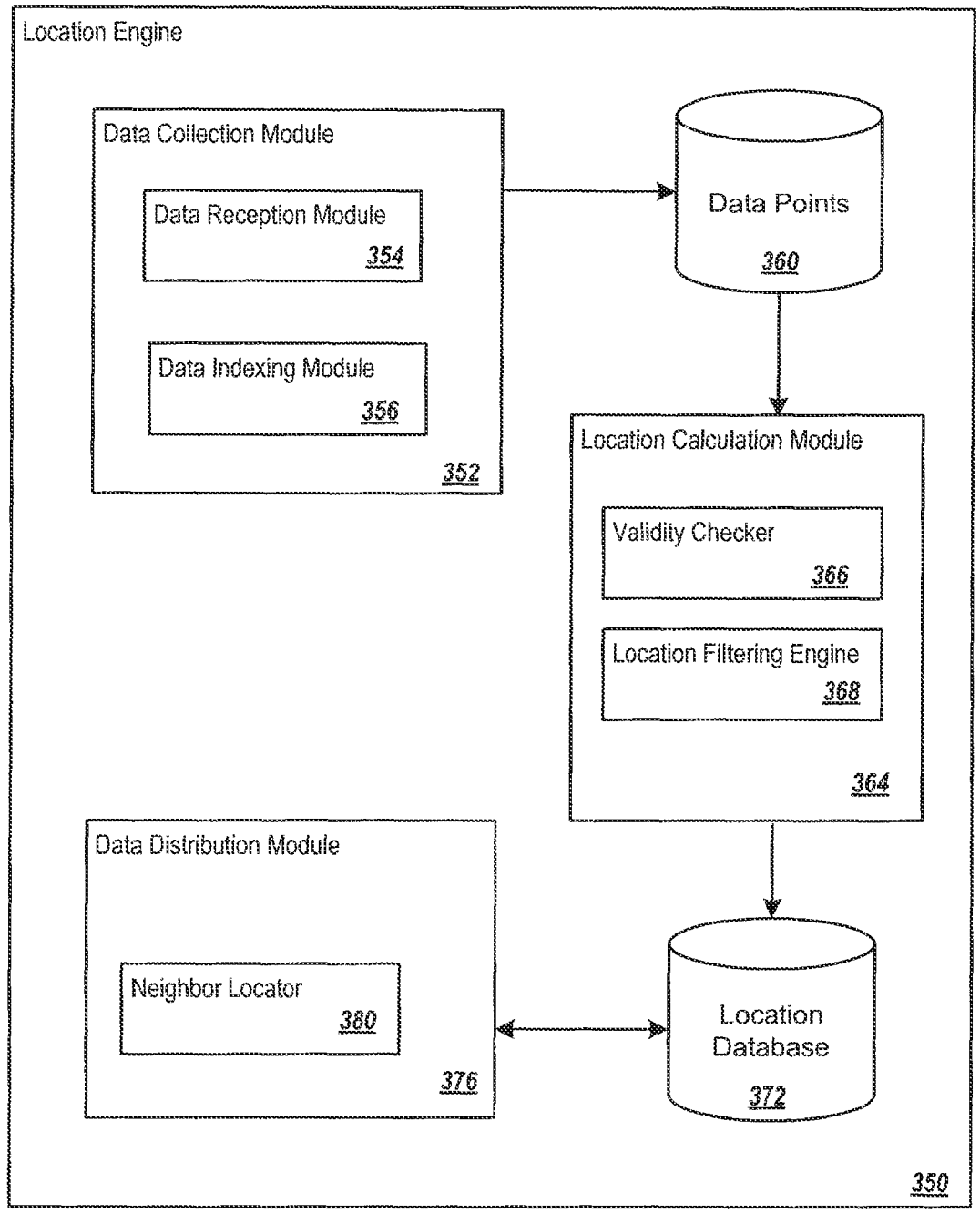
FIG. 4C is a block diagram illustrating an exemplary system implementing techniques of determining locations of wireless access points.

FIG. 4C is a block diagram illustrating an exemplary system implementing techniques of determining locations of wireless access points. The system can include one or more processors, one or more memory devices storing instructions, and other hardware or software components. The system can include location engine 350 that can be used to determine a presence area or presence space to be associated with an access point (e.g., access point 155).

Location engine 350 can include data collection module 352 that can receive data from various mobile devices through various access points. The data can include multiple data points that can indicate locations of one or more location-aware mobile devices (e.g., mobile devices 158) as well as identifiers of access points (e.g., MAC addresses of access points 155) indicating to which access point mobile devices 158 are connected. In some implementations, the data points can also include information on which time zone mobile devices 158 are located. Data collection module 352 can include data reception module 354, which can receive data transmitted from mobile devices 158 and data indexing module 356. Data indexing module 356 can perform various processing on the received data points. For example, data indexing module 356 can sort latitudes, longitudes, and altitudes based on cell IDs. Data indexing module 356 can also group data into sets based on time periods. For example, a new set of received locations can be created for a configurable period of time (e.g., six hours).

Sets of received locations of mobile devices 158 can be stored in data point database 360. Data point database 360 can store current and historical locations of various mobile devices 158. Data point database 360 can include an ad hoc database, relational database, and/or object-oriented database. Data point database 360 can be hosted locally or remotely in relation to location engine 350.

Location calculation module 364 can be utilized to calculate an average geographic location in sets of data points in data points database 360, calculate distances between the average geographic location and locations of various data points, and exclude locations from the sets for further computation. Location calculation module 364 can perform the calculations for a particular set (e.g., a set of data points associated with a cell ID) until an exit condition is reached for the particular set. Location calculation module 364 can determine presence areas or presence spaces for each access point (e.g., access point 155)

In some implementations, location calculation module 464 can perform validity checks on the presence areas or presence spaces based on various criteria and various data in the data points using validity checker 366. For example, the data points received from mobile devices 158 can include Mobile Country Codes (MCCs) and time zone information. Validity checker 366 can compare a calculated presence area or presence space with polygons corresponding to countries represented by the MCCs and polygons corresponding to the time zones. If a calculated presence area or presence space is located outside the polygons, validity checker 366 can register an anomaly and remove the access point.

Location filtering engine 368 can determine whether a presence area or presence space can be used to estimate a location of a mobile device that is currently connected to an access point. Location filtering engine 368 can divide a geographic region into cells 152 of geographic grid 150, or three-dimensional cells 172 of three-dimensional grid 170. Location filtering engine 368 can rank presence areas or presence spaces based on popularity, stability, longevity, and freshness. Location filtering engine 368 can assign the top-ranked presence areas or presence spaces located in each cell 152 or three-dimensional cell 172 to cell 152 or three-dimensional cells.

Presence areas and presence spaces can be defined by a center having the average latitude, longitude, and altitude coordinates of the set of locations. Presence areas and presence spaces can be further defined by a radius determined based on distances from locations in the set of locations to the center. The latitude, longitude, and altitude coordinates of centers for the presence areas and presence spaces and the radii of the presence areas and presence spaces can be stored in location database 372. Location database 372 can store both assigned and unassigned presence areas and presence spaces. Unassigned presence areas or presence spaces can be assigned in subsequent calculations by location calculation module 364. Location database 372 can be updated periodically by location calculation module 364.

The data of location database 372 can be distributed to mobile devices using data distribution module 376. Data distribution module 376 can send information of assigned presence areas and presence spaces (e.g., center coordinates and radii) that is associated with access points to mobile devices (e.g., non-GPS-enabled mobile device 160) upon request, through broadcasting, or using various push technology without receiving requests from the mobile devices.

In some implementations, data distribution module 376 can send multiple presence areas and presence spaces to mobile devices in one transmission session. To reduce the number of location transmissions to the mobile devices that can consume communication bandwidths of the mobile device, data distribution module 376 can use neighbor locator 378 to locate cells that are neighbors of the cell in which mobile device 160 is located. Neighboring cells can include, for example, a number of cells surrounding the cell in which mobile device 160 is located such that the total area of the cell and the surrounding cells cover a certain geographic area (e.g., one or two squire kilometers). Sending information on presence areas and presence spaces associated with multiple cells (e.g., 400 cells) to mobile device 160 can reduce the number of transmissions when mobile device 160 moves across cells. In such implementations, data distribution module 376 only needs to send an update to mobile device 160 when mobile device 160 moves out of all cells previously sent.

Determining Locations of Mobile Devices Using Locations Filtering

Figure 5A:
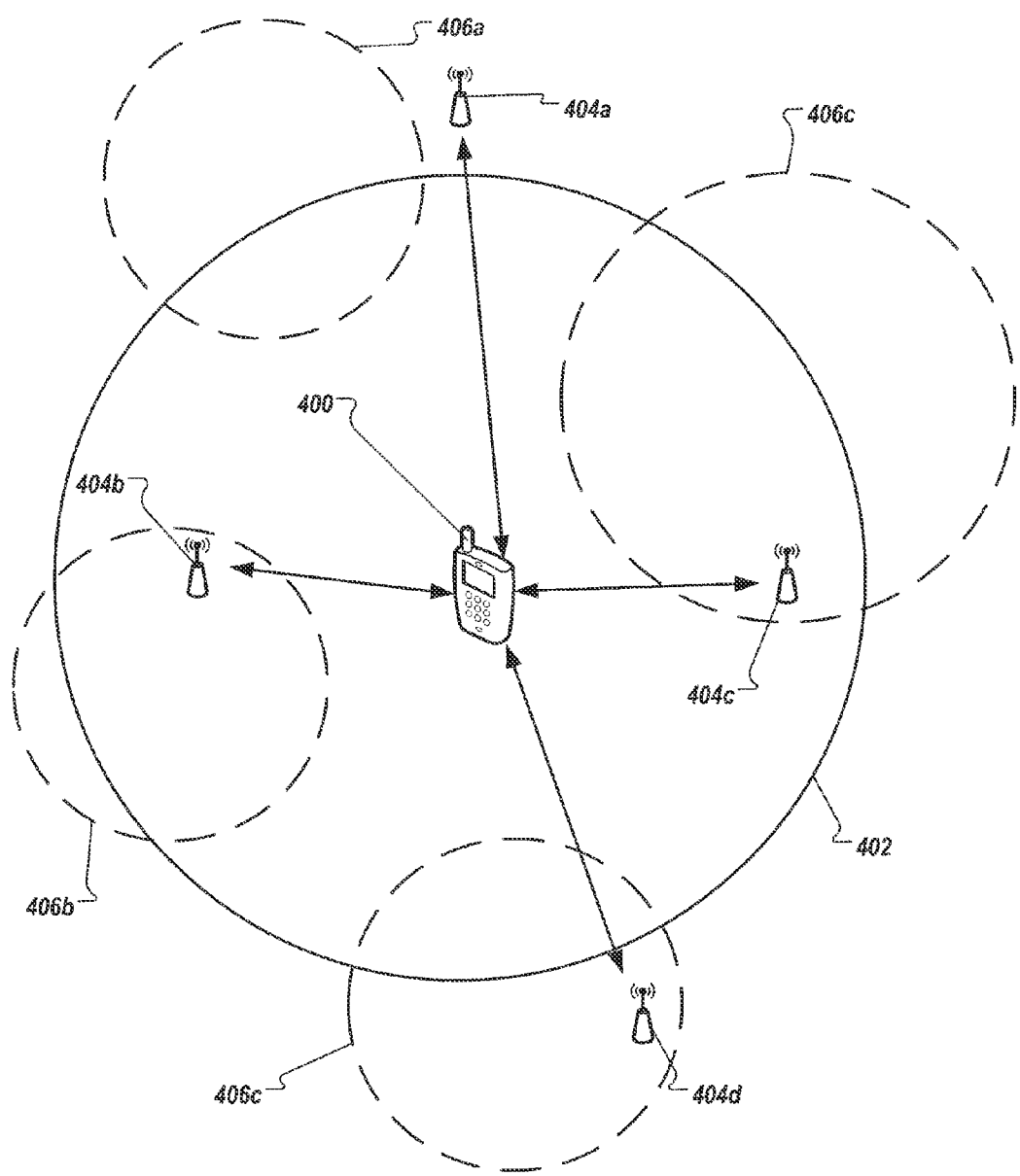
FIG. 5A illustrates techniques for determining locations of mobile devices using techniques of determining locations of wireless access points.

FIG. 5A illustrates techniques for determining locations of mobile devices using locations of wireless access points. Mobile device 400 can be an exemplary mobile device that can use locations of wireless access points to determine its location. An exemplary section of a communication network that includes access points 400 is illustrated.

Mobile device 400 can be wirelessly connected to access point 404a. From access point 404a, mobile device 400 can receive data that include information on presence areas or presence spaces (including presence areas 406) of neighboring access points. Mobile device 400 can store the received data on a storage device. The stored data can be updated periodically.

In the example shown, mobile device 400 is connected to access point 400a. In addition, mobile device 400 is within communication ranges to access points 404b, 404c, and 404d. Mobile devices 400 can identify access points 404a, 404b, 404c, and 404d under wireless communication protocols used in the WLAN (e.g., IEEE 802.11a). Access points 404a, 404b, 404c, and 404d can be identified by MAC addresses of the access points or other identifiers (e.g., Bluetooth™ identifiers).

Mobile device 400 can identify presence areas 406a, 406b, 406c, and 406d that are associated with access points 404a-d, respectively. Identifying presence areas 406a-d can include retrieving information on the presence areas 406a-d from a memory device coupled to mobile device 400. In some implementations, mobile device 400 can request from a server the presence areas 406*a-d* by sending to the server identifiers of access points 404*a-d*.

Based on presence areas 406*a-d*, mobile device 400 can execute an iterative process (e.g., a multi-pass analysis) on the presence areas 406*a-d*. The iterative process can produce geographic area 402, which can be an estimate of mobile device 400's current geographic location. Geographic area 402 can be a geographic space when three-dimensional location information is utilized. Mobile device 400 can display the estimated current location on a display device (e.g., on a map display).

Figure 5B:
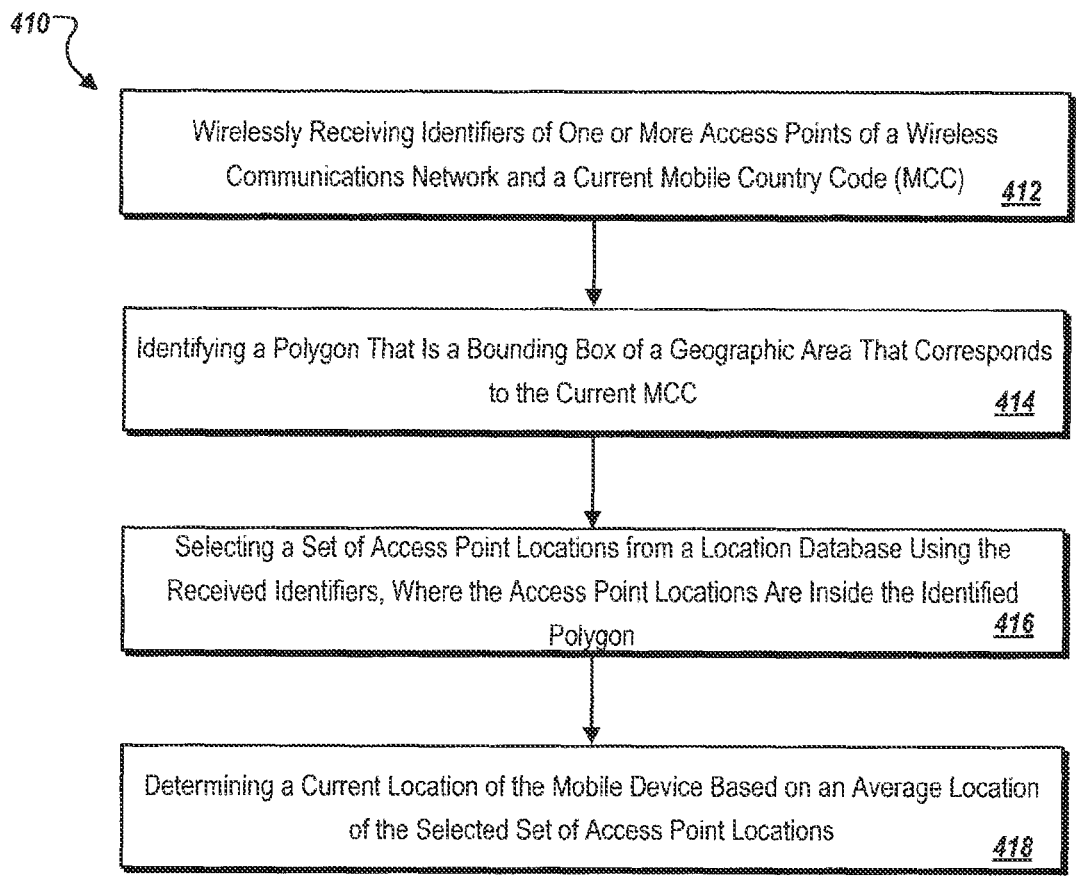
FIG. 5B is a flowchart illustrating an exemplary process of location filtering using mobile country code.

FIG. 5B is a flowchart illustrating exemplary process 410 of location filtering using mobile country code. For convenience, process 410 will be described in reference to mobile device 400 that implements process 410.

Mobile device 400 can wirelessly receive (412) identifiers of one or more access points 404 and a current MCC. The identifiers (e.g., MAC addresses) of access points 404 can be received from the access points. Access points can have overlapping coverage areas. For example, mobile device 400 can be located within a communication range of multiple access points (e.g., access points 404). The MCC can be received from a transceiver (e.g., a cell tower) of a cellular communications network.

Mobile device 400 can identify (414) a polygon that is a bounding box of a geographic area that corresponds to the current MCC. The geographic area can correspond to a country or a portion of a country (e.g., Alaska). The polygon can be defined by latitude and longitude coordinates of extreme points of the geographic area. The polygon can be identified from a geographic database storing the polygon in association with the MCC. The geographic database can be a database local to mobile device 400. For example, mobile device 400 can store in a local geographic database the polygons that are bounding boxes of geographic areas identified by MCCs. The geographic database can also be stored remotely (e.g., on a remotely-located server computer). The geographic database can be pre-populated by a server and installed on (e.g., downloaded to) mobile device 400.

In some implementations, polygons of countries can further be associated with time zones, which can extend MCC based location filtering. The polygon can be further be defined by time zones within a country. The polygon can be identified by MCC in combination with a current time zone. For example, bounding boxes 102*a-c* can be associated with MCCs 310-316 (United States). Bounding box 102*a* can be further associated with Alaska time zone (Greenwich Mean Time (GMT) minus nine hours for standard time). Bounding box 102*b* can be further divided to four sub-boxes, each sub-box corresponding to Eastern Time Zone (GMT minus five hours), Central Time Zone (GMT minus six hours), Mountain Time Zone (GMT minus seven hours), and Pacific Time Zone (GMT minus eight hours). Bounding box 102*c* can further be associated with Hawaii/Aleutian time zone (GMT minus 10 hours).

Mobile device 400 can receive from a cell tower an encoded current time zone. A communications and controls processor (e.g., a baseband processor) of mobile device 400 can decode the received current time zone. From the MCC and current time zone, mobile device 400 can identify a sub-bounding box. If mobile device 400 detects that a location of an access point to which mobile device 400 is connected is outside the sub-bounding box, the mobile device can filter out that access point. For example, if mobile device 400 has determined that a current MCC is "310" (United States of America), mobile device 400 can identify binding boxes 102. When mobile device 400 determines that the current time zone is GMT minus 10 hours, mobile device can determine that the bounding box is 102*c*. Mobile device 400 can use bounding box 102*c* for subsequent calculations.

Mobile device 400 can select (416) a set of access point locations from a location database using the received access point identifiers. A location can be selected if the location is inside the identified polygon. The location database can include identifiers of access points (e.g., MAC addresses) and corresponding geographic coordinates of the access points. The location database can be stored on mobile device 400. For example, mobile device can include a set of pre-determined locations of access points (e.g., access points at or near airports). The location database can be updated periodically from a server. The location database can be updated, for example, when the server detects a movement of an access point. Location records corresponding to currently-connected access points that are outside the polygon corresponding to the current MCC and time zone can be excluded from the location database and from further calculations.

Mobile device 400 can determine (418) a current location of mobile device 400 based on an average location of the selected set of access point locations. Determining the current location can include applying an adaptive location calculation process to the set of access point locations, which have already been filtered using the MCC and time zone. Further details of determining the current location, including the adaptive location calculation process, will be described below in further detail with respect to FIG. 5C. Mobile device 400 can display the current location on a map display of the mobile device.

Figure 5C:
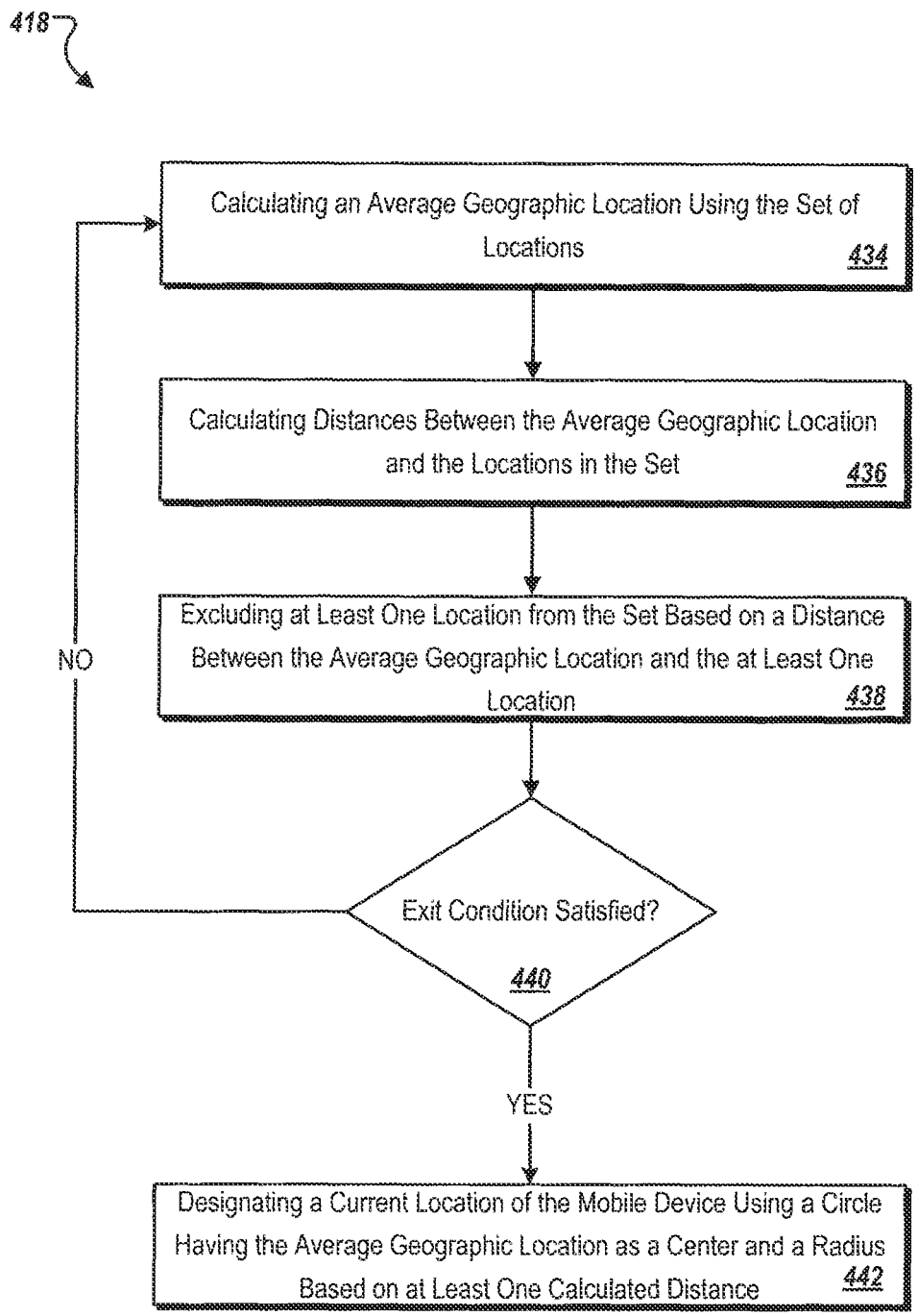
FIG. 5C is a flowchart illustrating an exemplary process of determining a location of a mobile device using filtered locations of wireless access points.

FIG. 5C is a flowchart illustrating exemplary process 418 of determining a location of a mobile device using locations of wireless access points. For convenience, process 418 will be described in reference to mobile device 400 that implements process 418.

The location database can include identifiers of access points (e.g., access points 404) of a wireless communication network (e.g., a WLAN) and a set of locations associated with the access points. The set of locations can correspond to presence areas 406 or presences spaces associated with the access point. Each location can be represented by geographic coordinates (e.g., latitude, longitude, and altitude). Each location can be associated with an identifier (e.g., a MAC address) of an access point 404. In various implementations, the set of locations be received from a server periodically or upon request.

Mobile device 400 can calculate (434) an average geographic location using the locations in the set. Calculating the average geographic location can include calculating an average of latitudes, longitudes, and altitudes of the locations in the set, and designating a position at the calculated average latitude, longitude, and altitude as the average geographic location. In some implementations, calculating the average geographic location can include designating a location at a median latitude, median longitude, and median altitude of the positions in the set as the average geographic location.

Mobile device 400 can calculate (436) distances between the locations in the set and the average geographic location. In some implementations, the system can calculate a linear distance between each of the locations in the set and the average geographic location in Euclid space. In some implementations, the system can calculate a geodesic distance between each of the locations in the set and the average geographic location, taking curvature of the earth into consideration.

The distances calculated in stage 436 can be designated as a radius associated with a center. The center can be the average geographic location calculated in stage 434, which can be a center of a circle (e.g., circle surrounding geographic area 402). The radius of the circle can be determined based on at least one distance between a location in the set of locations and the average geographic location. In some implementations, the radius can equal to the longest distance between the average geographic location and a location remaining in the set. In some implementations, the radius can be a distance that, when a circle is drawn using the radius and the average geographic location as a center, the circle can enclose a percentage (e.g., 80 percent) of the locations remaining in the set. The radius can represent a margin of error beyond which an estimation of a location of a non-GPS-enabled mobile device is less likely to be statistically meaningful.

Mobile device 400 can exclude (438) from the set at least one location based on a distance between the average location and the location. In some implementations, the system can exclude locations whose distance to the average geographic location exceeds a threshold distance. In each pass of the multi-pass analysis, the system can increase a precision of the estimated average geographic location by excluding locations that appear to be away from a concentration of locations (e.g., a cluster). A location that is away from a cluster of locations can be less useful in estimating a current location of mobile device 400, and can be excluded. In various implementations, the threshold distance can vary from one pass to a next pass. In some implementations, the threshold distance can be a distance to the average geographic location within which a certain percentage (e.g., 95 percent) of locations in the set are located. In some implementations, the threshold distance can be a set of distances corresponding to the passes (e.g., 50 meters for the first pass, 30 meters for the second pass, etc.). The system can exclude at least one location from the set when the distance between the average geographic location and the location exceeds the threshold distance.

Mobile device 400 can repeat stages 434, 436, and 438 of process 430 until an exit condition is satisfied. The system can determine (440) whether an exit condition is satisfied for terminating the repetition. In some implementations, the exit condition can be satisfied when a number of repetitions reach a threshold number (e.g., five times). The threshold number can relate to a number of locations in the originally received set. The threshold number, as well as the percentage of locations to exclude, can be configurable to fine tune a balance between certainty (e.g., a larger presence area can result in more confidence that a mobile device in the cell is actually located in the presence area) and precision (e.g., a smaller presence area can result in more accurate location of a mobile device). For example, when the percentage is set to 95 percent and the number of passes is set to 10, the final pass can produce a circle that encompasses about 60 percent of all location data points.

In some implementations, the exit condition of stage 330 can be satisfied when the presence area or presence space is sufficiently small. In areas where access points 404 are highly concentrated, an estimated current location can include an area sufficiently small that further passes will not necessarily increase the precision. The repetition of stages 434, 436, and 438 can terminate when the radius of the circle reaches below a threshold radius. For example, the threshold radius can be 8-10 meters. The threshold radius can be based on radii of presence areas 406. In some implementations, if some radii of presence areas 406 are sufficiently small, the threshold radius can be small, to reflect a confidence on the estimate.

Mobile device 400 can display (442) the current location of mobile device 400 using a circle having the average geographic location as a center and a radius based on at least one calculated distance. The center can be represented in latitudes and longitudes. In some implementations where distances are calculated in three-dimensional spaces, the center can further be represented in an altitude. In some implementations, mobile device can further display the current location on a display device on a map user interface. Exemplary map user interfaces will be described below in reference to FIG. 6.

Exemplary User Interfaces for Determining Locations of Mobile Devices

Figure 6:
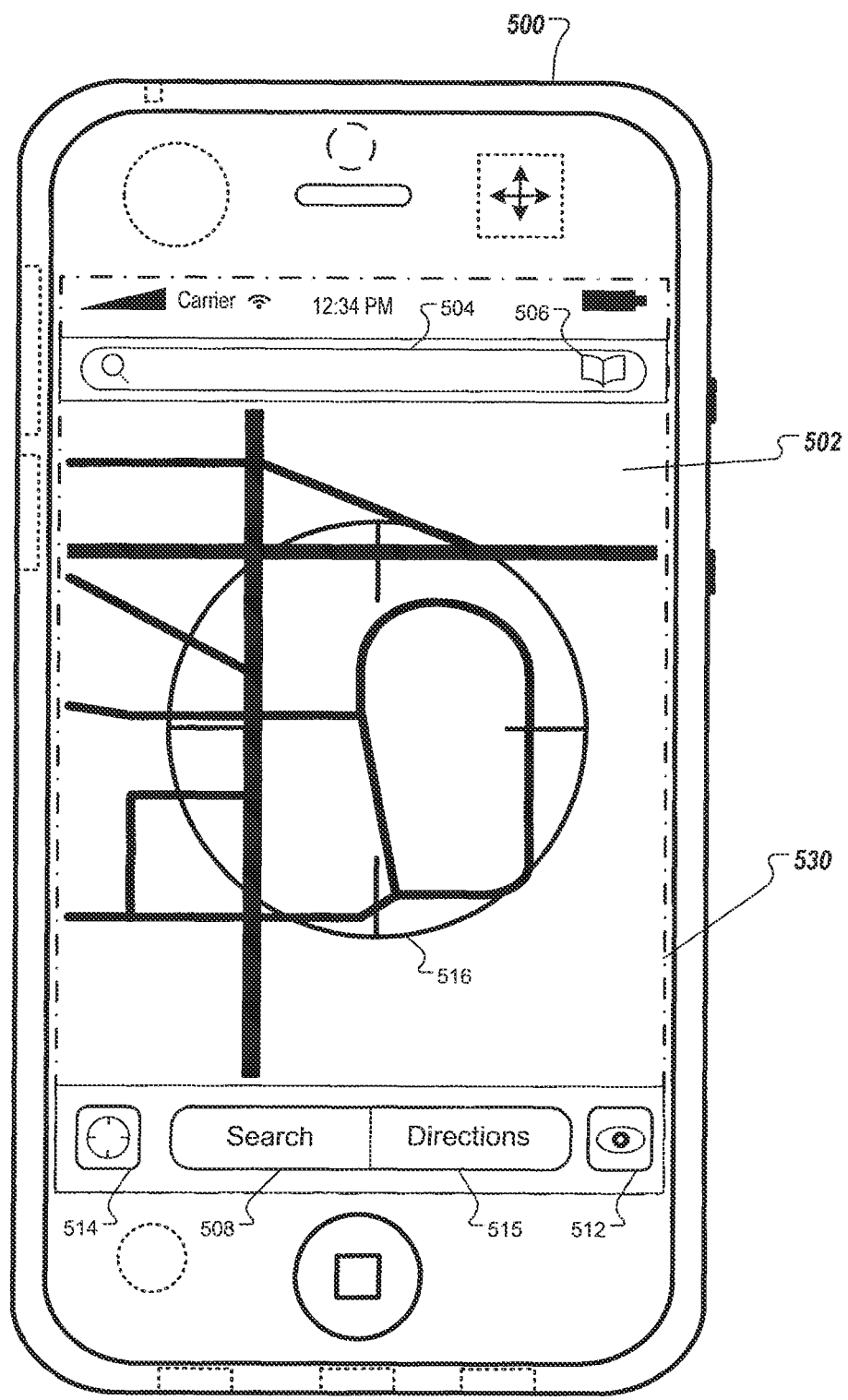
FIG. 6 illustrates an exemplary user interface for determining locations of mobile devices using locations of wireless access points.

FIG. 6 illustrates an exemplary user interface for determining locations of mobile devices using locations of wireless access points. In FIG. 6, an exemplary map (map 502) with a geographic area is displayed on mobile device 500. In some implementations, mobile device 500 can display the map 502 on the touch sensitive display 530 of mobile device 500. The map 502 can be displayed when a user selects the maps object 144 to view mapping and location based services. In some implementations, objects, such as the maps object 144, can be selected by voice activation. A search bar 504 and a bookmarks list object 506 can be displayed at the top of the map 502. Below the bottom of the map one or more display objects can be displayed, for example a search object 508, a directions object 510, a map view object 512, and a current location object 514.

The search bar 504 can be used to find an address or other location on the map. For example, a user can enter their home address in the search bar 504, and the region containing the address would be displayed on the map 502. The bookmarks list object 506 can, for example, bring up a Bookmarks list that contains addresses that are frequently visited, such as a user's home address. The Bookmarks list can also, for example, contain special bookmarks such as the current location (e.g. the current, location of mobile device 500).

The search object 508 can be used to display the search bar 504 and other map related search menus. The directions object 510 can, for example, bring up a menu interface that allows the user to enter a start and end location. The interface can then display information (e.g., directions and travel time for a route from the start location to the end location). The map view object 512 can bring up a menu that will allow the user to select display options for the map 502. For example, the map 502 can be changed from black and white to color, the background of the map can be changed, or the user can change the brightness of the map.

The current location object 514 can allow the user to see a geographic area 516 on the map 502 indicating where the device 150 is currently located. Geographic area 516 can correspond to an estimated geographic area (e.g., geographic area 402) whose center is an average geographic location of data points associated with access points that are within communication range of mobile device 500. Radius of geographic area 516 can be determined based on a distance between the average geographic location and one or more locations associated with the access points. A special current location bookmark can be placed in the Bookmarks list when the current location object 514 is selected. If the special current location bookmark was previously set in the Bookmarks list, the old bookmark information can, for example, be replaced with the new current location information. In some implementations, the special current location bookmark is tied to the centroid of geographic area 516. That is, the special current location bookmark can include the coordinates for the centroid of the geographic area 516. The geographic area 516 can be based on location data determined or estimated using location instructions stored in a memory device of mobile device 500. The geographic area 516 can, for example, be depicted by a circle, rectangle, square, hexagon, or other enclosed region with crosshairs, or some other distinctive element to differentiate the geographic area 516 from the map 502.

In some implementations, geographic area 516 can indicate a region in which mobile device 500 is determined or estimated to be located, and the geographic area may not necessarily be centered on the actual current position of mobile device 500. In this example, mobile device 500 may be located off-center within the geographic area. In another example, geographic area 516 can be centered on an estimated current position of mobile device 500.

Mobile device 500 can, for example, center the map view on the geographic area 516 when the current location object 514 is tapped or otherwise selected. In some implementations, the zoom level of the map can be adjusted based on the accuracy or precision of the location data or the technology, system, or service that provided the location data. For example, the map can be zoomed out when mobile device 500 cannot receive GPS signals for lower accuracy and uses access point data to determine its location. The map can be zoomed in for higher accuracy if mobile device 500 is capable of using GPS location data to determine its current location. In some implementations, the zoom level can be based on the velocity of mobile device 500 (e.g., the map can be zoomed out at higher velocities and zoomed in when mobile device 500 is not moving). A combination of accuracy or precision and velocity can also be used.

If all methods for retrieving location-based data fail (e.g., when mobile device 500 is not within communication range of any access point, or when validity checker 366 determines that no presence area can be associated with any access points where mobile device 500 can be connected), and there are no other systems or services available for determining or estimating the current position of mobile device 500, an error can be displayed to the user and no geographic area is displayed on the map 502. The error can, for example, contain a message to the user informing them of the failure and the possible reason or reasons for the failure.

Current location object 514 can be selected, for example, to activate the estimating and displaying of geographic area 516 on map 502, to get directions to or from the estimated current location (i.e., the centroid of geographic area 516), to send the estimated current location of mobile device 500 to a friend (e.g., such that the friend can go to the same location), or to create a bookmark for the estimated current location.

Exemplary Mobile Device Architecture

Figure 7:
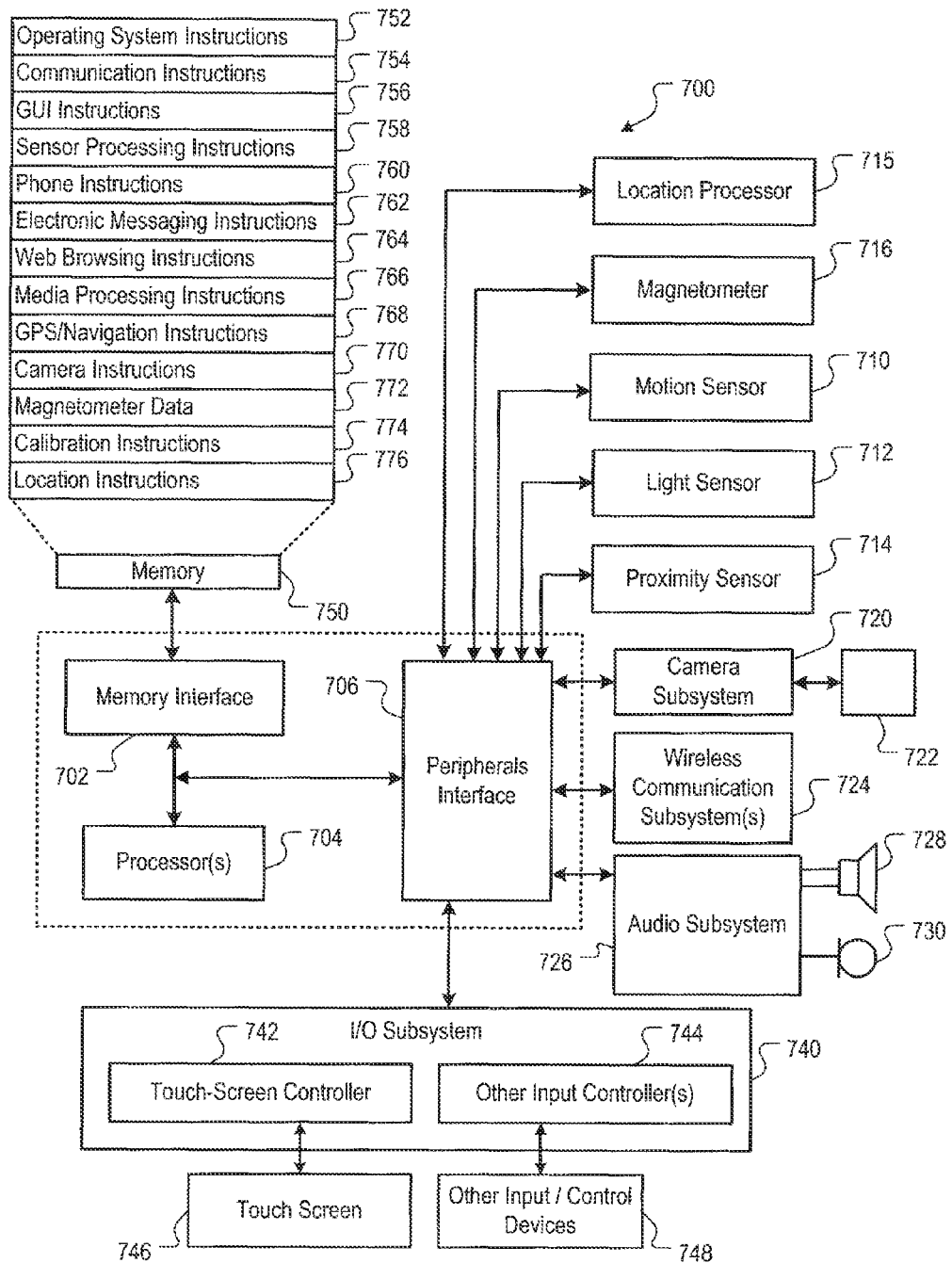
FIG. 7 is a block diagram of an exemplary architecture of a mobile device.

FIG. 7 is a block diagram of an exemplary architecture 700 of a mobile device. The Mobile device can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

The mobile device can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 150 can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the mobile device is intended to operate. For example, the mobile device may include communication subsystems 724 designed to operate over a GSM network, a GPRS network, an EDGE network, a Wi-Fi or WiMax network, and a Bluetooth network. In particular, the wireless communication subsystems 724 may include hosting protocols such that the device may be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include a touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to the mobile device on or off. The user may be able to customize a functionality of one or more of the buttons. The touch screen 746 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. Memory 750 can include location instructions 776 that can be used to transmit a current location to an access point, and to determine an estimated current location based on location data associated with access points to which the mobile device is within a communication range. Memory 750 can also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device can be implemented in hardware and/or in software, including in one or more signal processing and/or application specific integrated circuits.

A number of implementations of the subject matter have been described. Nevertheless, it will be understood that various modifications can be made without departing from the spirit and scope of the invention. For example, the location-aware devices are referred to as GPS-enabled. Location-aware mobile devices can also be based triangulation or other technology. Cells are represented as substantially rectangular in shape in the figures. The actual shape of a cell can vary. Locations are described as "circles." The term "circle" used in this specification can include any geometric shape (e.g., an ellipsis, a square, a convex or concave polygon, or a free-style shape) that need not be perfectly circular but is closed or has an appearance of an enclosure. The radius of a geometric shape that is not perfectly circular can include an average distance between various points on the boundary of the geometric shape and a center of the geometric shape. WiFi and WiMax networks are used as examples. Other wireless technology (e.g., cellular network) can also be employed. Accordingly, other implementations are within the scope of the following claims.

What is claimed is:

1. A method executed by a mobile device, comprising:
receiving identifiers of one or more access points of a wireless communications network and a current mobile country code (MCC);
identifying a polygon that is a bounding box of a geographic area that corresponds to the current MCC;
selecting a set of access point locations from a location database using the received identifiers, where the access point locations are inside the identified polygon, wherein selecting the set of access point locations comprises:
identifying an outlier from the access point locations, including identifying an access point the identifier of which is received by the mobile device wherein, according to a location record stored on the mobile device, the location of the access point is located outside of the polygon that corresponds to the current MCC; and
filtering out the outlier from the set of access point locations; and
determining a current location of the mobile device based on an average location of the selected set of access point locations.

2. The method of claim 1, further comprising:
storing in a geographic database polygons that are bounding boxes of geographic areas identified by mobile country codes; and
storing in the location database on a storage device of the mobile device.

3. The method of claim 1, further comprising:
displaying the current location on a map display of the mobile device.

4. The method of claim 1, where the identifiers of the access points include Media Access Control (MAC) addresses of the access points.

5. The method of claim 1, where the polygon is defined by latitude and longitude coordinates of points of the geographic area.

6. The method of claim 1, where the geographic area further corresponds to a time zone.

7. The method of claim 1, where determining the current location comprises:
calculating an average geographic location using the set of access point locations;
calculating distances between the average geographic location and access point locations in the set;
excluding at least one access point location from the set based on a distance between the average geographic location and the at least one location;
repeating the operations of calculating an average geographic location, calculating distances, and excluding at least one access point location until an exit condition is satisfied; and
designating a current location of the mobile device using a circle having the average geographic location as a center and a radius based on at least one calculated distance.

8. The method of claim 7, where the exit condition is satisfied when a number of repetitions reaches a threshold number.

9. The method of claim 7, where the exit condition is satisfied when the radius of the circle reaches below a threshold radius.

10. The method of claim 7, where each of the locations in the set includes a latitude, and a longitude.

11. A system, comprising:
a mobile device configured to perform operations comprising:
receiving identifiers of one or more access points of a wireless communications network and a current mobile country code (MCC);
identifying a polygon that is a bounding box of a geographic area that corresponds to the current MCC;
selecting a set of access point locations from a location database using the received identifiers, where the access point locations are inside the identified polygon, wherein selecting the set of access point locations comprises:
identifying an outlier from the access point locations, including identifying an access point the identifier of which is received by the mobile device wherein, according to a location record stored on the mobile device, the location of the access point is located outside of the polygon that corresponds to the current MCC; and
filtering out the outlier from the set of access point locations; and
determining a current location of the mobile device based on an average location of the selected set of access point locations.

12. The system of claim 11, the operations further comprising:
storing in a geographic database polygons that are bounding boxes of geographic areas identified by mobile country codes; and
storing in the location database on a storage device of the mobile device.

13. The system of claim 11, the operations further comprising:
displaying the current location on a map display of the mobile device.

14. The system of claim 11, where the identifiers of the access points include Media Access Control (MAC) addresses of the access points.

15. The system of claim 11, where the polygon is defined by latitude and longitude coordinates of points of the geographic area.

16. The system of claim 11, where the geographic area further corresponds to a time zone.

17. The system of claim 11, where determining the current location comprises:
calculating an average geographic location using the set of access point locations;
calculating distances between the average geographic location and access point locations in the set;
excluding at least one access point location from the set based on a distance between the average geographic location and the at least one location;
repeating the operations of calculating an average geographic location, calculating distances, and excluding at least one access point location until an exit condition is satisfied; and
designating a current location of the mobile device using a circle having the average geographic location as a center and a radius based on at least one calculated distance.

18. The system of claim 17, where the exit condition is satisfied when a number of repetitions reaches a threshold number.

19. The system of claim 17, where the exit condition is satisfied when the radius of the circle reaches below a threshold radius.

20. The system of claim 17, where each of the locations in the set includes a latitude, and a longitude.

21. A computer program product tangibly stored on a storage device, operable to cause a mobile device to perform operations comprising:
receiving identifiers of one or more access points of a wireless communications network and a current mobile country code (MCC);
identifying a polygon that is a bounding box of a geographic area that corresponds to the current MCC;
selecting a set of access point locations from a location database using the received identifiers, where the access point locations are inside the identified polygon, wherein selecting the set of access point locations comprises:
identifying an outlier from the access point locations, including identifying an access point the identifier of which is received by the mobile device wherein, according to a location record stored on the mobile device, the location of the access point is located outside of the polygon that corresponds to the current MCC; and
filtering out the outlier from the set of access point locations; and
determining a current location of the mobile device based on an average location of the selected set of access point locations.

22. The product of claim 21, the operations further comprising:
storing in a geographic database polygons that are bounding boxes of geographic areas identified by mobile country codes; and
storing in the location database on a storage device of the mobile device.

23. The product of claim 21, the operations further comprising:
displaying the current location on a map display of the mobile device.

24. The product of claim 21, where the identifiers of the access points include Media Access Control (MAC) addresses of the access points.

25. The product of claim 21, where the polygon is defined by latitude and longitude coordinates of points of the geographic area.

26. The product of claim 21, where the geographic area further corresponds to a time zone.

27. The product of claim 21, where determining the current location comprises:
calculating an average geographic location using the set of access point locations;
calculating distances between the average geographic location and access point locations in the set;
excluding at least one access point location from the set based on a distance between the average geographic location and the at least one location;
repeating the operations of calculating an average geographic location, calculating distances, and excluding at least one access point location until an exit condition is satisfied; and
designating a current location of the mobile device using a circle having the average geographic location as a center and a radius based on at least one calculated distance.

28. The product of claim 27, where the exit condition is satisfied when a number of repetitions reaches a threshold number.

29. The product of claim 27, where the exit condition is satisfied when the radius of the circle reaches below a threshold radius.

30. The product of claim 27, where each of the locations in the set includes a latitude, and a longitude.

* * * * *